US012756824B2

(12) United States Patent
Venugopal et al.

(10) Patent No.: US 12,756,824 B2
(45) Date of Patent: Oct. 6, 2026

(54) REGION BASED INTRA BLOCK COPY

(71) Applicant: Fraunhofer-Gesellschaft zur Förderung der angewandten Forschung e.V., Munich (DE)

(72) Inventors: Gayathri Venugopal, Berlin (DE); Santiago De Luxán Hernández, Berlin (DE); Karsten Müller, Berlin (DE); Benjamin Bross, Berlin (DE); Heiko Schwarz, Berlin (DE); Detlev Marpe, Berlin (DE); Thomas Wiegand, Berlin (DE)

(73) Assignee: FRAUNHOFER-GESELLSCHAFT ZUR FORDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 18/799,326

(22) Filed: Aug. 9, 2024

(65) Prior Publication Data

US 2025/0030852 A1 Jan. 23, 2025

Related U.S. Application Data

(63) Continuation of application No. 17/540,527, filed on Dec. 2, 2021, now Pat. No. 12,095,989, which is a (Continued)

(30) Foreign Application Priority Data

Jun. 7, 2019 (EP) .................................... 19179091

(51) Int. Cl.

| | |
|---|---|
| ***H04N 19/119*** | (2014.01) |
| ***H04N 19/176*** | (2014.01) |
| ***H04N 19/593*** | (2014.01) |

(52) U.S. Cl.
CPC ......... *H04N 19/119* (2014.11); *H04N 19/176* (2014.11); *H04N 19/593* (2014.11)

(58) Field of Classification Search
None
See application file for complete search history.

(56) References Cited

U.S. PATENT DOCUMENTS

| | | | | |
|---|---|---|---|---|
| 9,743,103 | B1 | 8/2017 | Maaninen | |
| 9,762,908 | B2 * | 9/2017 | Kim | H04N 19/139 |
| 10,477,232 | B2 * | 11/2019 | Pang | H04N 19/105 |
| 2008/0126278 | A1 | 5/2008 | Bronstein | |
| 2009/0103771 | A1 | 4/2009 | Kamio | |
| 2010/0128978 | A1 | 5/2010 | Ono | |
| 2014/0071146 | A1 | 3/2014 | Sanghvi | |

(Continued)

FOREIGN PATENT DOCUMENTS

| | | | |
|---|---|---|---|
| CN | 102447894 | B | 11/2013 |
| CN | 105874791 | A | 8/2016 |
| WO | 2015/102975 | A1 | 7/2015 |

OTHER PUBLICATIONS

Chinese language office action dated Oct. 31, 2024, issued in application No. CN 202080042116.5.

(Continued)

*Primary Examiner* — Talha M Nawaz
(74) *Attorney, Agent, or Firm* — McClure, Qualey & Rodack, LLP

(57) ABSTRACT

In an encoder and a decoder for Region Based Intra Block Copy, the encoder may be configured for block-based encoding a picture into a data stream, and the decoder may be configured for block-based decoding a picture from a data stream. The encoder and decoder may further be configured to determine for a current block of the picture a difference between a first predetermined block and a second predetermined block inside a block search area. The encoder may encode the difference into the data stream and the decoder may derive the difference from the data stream. According to (Continued)

the innovative principle, the encoder and the decoder may be configured to partition the block search area into multiple block search regions.

19 Claims, 15 Drawing Sheets

Related U.S. Application Data continuation of application No. PCT/EP2020/065672, filed on Jun. 5, 2020.

(56) References Cited

U.S. PATENT DOCUMENTS

| | | | | |
|---|---|---|---|---|
| 2014/0328388 | A1* | 11/2014 | Kim | H04N 19/105<br>375/240.02 |
| 2015/0195526 | A1 | 7/2015 | Zhu | |
| 2015/0271517 | A1* | 9/2015 | Pang | H04N 19/52<br>375/240.16 |
| 2017/0163986 | A1* | 6/2017 | Jacobson | H04N 19/105 |
| 2017/0347108 | A1 | 11/2017 | Maaninen | |
| 2021/0266567 | A1* | 8/2021 | Xu | H04N 19/105 |
| 2021/0329235 | A1* | 10/2021 | Okawa | H04N 19/119 |

OTHER PUBLICATIONS

English language translation of office action dated Oct. 31, 2024 (pp. 1-9 of attachment).

Office Action dated Mar. 21, 2025, issued in application No. EP 20 729 798.7.

Wang, H., et al.; "Region based motion vector prediction using data hiding and decoder side reasoning;" Visual Communications and Image Processing (VCIP); IEEE; Nov. 2011; pp. 1-4.

International Search Report and Written Opinion issued in application No. PCT/EP2020/065672.

Xu, X., et al.; "Intra Block Copy in HEVC Screen Content Coding Extensions;" IEEE Journal on Emerging and Selected Topics in Circuits and Systems; vol. 6; No. 4; Dec. 2016; pp. 409-419.

Sullivan, G., et al.; "Meeting Report of the 12th meeting of the Joint Video Experts Team (JVET), Macao, CN, Oct. 3-12, 2018;" Joint Video Experts Team (JVET) of ITU-T SG 16 WP 3 and ISO/IEC JTC 1/SC 29/WG 11; Oct. 2018; pp. 1-346.

Chien, W.J., et al.; "CE8-related: CPR mode signaling and interaction with inter coding tools;" Joint Video Experts Team (JVET) of ITU-T SG 16 WP 3 and ISO/IEC JTC 1/SC 29/WG 11; Jan. 2019; pp. 1-7.

Xu, X., et al.; "CE8: CPR reference memory reuse without increasing memory requirement (CE8.1.2a and CE8.1.2d);" Joint Video Experts Team (JVET) of ITU-T SG 16 WP 3 and Iso/iec jtc 1/SC 29/WG 11; Jan. 2019; pp. 1-8.

"ITU-T H.266 Series H: Audiovisual and Multimedia Systems, Infrastructure of audiovisual services—Coding of moving video Versatile video coding;" Aug. 2020; pp. 1-516.

Chen, J., et al.; "Algorithm description for Versatile Video Coding and Test Model 4 (VTM 4);" Joint Video Experts Team (JVET) of ITU-T SG 16 WP 3 and ISO/IEC JTC 1/SC 29/WG 11; Jan. 2019; pp. 1-62.

* cited by examiner

REGION BASED INTRA BLOCK COPY

CROSS-REFERENCES TO RELATED APPLICATIONS

This application is a continuation of copending U.S. patent application Ser. No. 17/540,527, filed Dec. 2, 2021, now U.S. Pat. No. 12,095,989, which in turn is a continuation of copending International Application No. PCT/EP2020/065672, filed Jun. 5, 2020, which is incorporated herein by reference in its entirety, and additionally claims priority from European Application No. EP 19179091.4, filed Jun. 7, 2019, which is incorporated herein by reference in its entirety.

Embodiments of the present disclosure relate to an encoder for block-based encoding a picture into a data stream and a decoder for block-based decoding a picture from a data stream, as well as a method for block-based encoding and a method for block-based decoding. Some particular embodiments may be concerned with a region based intra block copy coding scheme.

BACKGROUND OF THE INVENTION

Intra Block Copy (IBC) is one of the intra prediction methods used in the HEVC Screen content Coding (SCC) extensions [1]. This approach is also adopted into H.266/Versatile Video coding [2]. At the encoder side, the aforementioned method searches for a similar block for the original block in the current reconstructed picture. An error minimizing metric (sum of absolute differences (SAD) in this case) is used for the block matching (BM) algorithm. During the BM search, integer sample positions are checked for finding the best match for the current original block by calculating the SAD between the two blocks. The block that gives the least SAD error is considered as the best match for the original block and it is called the prediction block. The relative displacement of the prediction block from the current block is called the block vector. Since transmitting the complete block vector may use a large number of bits, predictive coding of the block vector is used. This is similar to the predictive coding of the motion vector of the normal inter method.

IBC is a current picture referencing tool, which is different from the typical intra or inter prediction methods. Therefore, a new prediction mode called MODE_IBC is introduced into the bitstream apart from the normal MODE_INTER and MODE_INTRA [3].

The encoder and decoder maintain a predictor list for the purpose of block vector coding (similar to motion vectors in normal inter mode). The block vectors from the neighbouring blocks are utilized for generating this predictor list. Thus, a predictor block is also a block present anywhere in the search area. The maximum number of candidates in the predictor list is two.

As will be explained afterwards in some more details with reference to FIG. 11, if the block vector of the current block is by and the block vector of the predictor block is bvp, then the difference bvd between them is signalled to the decoder. The encoder estimates the bits that may be used for signalling bvd using each of the two candidates in the predictor list. The candidate that the least number of bits is regarded as the final predictor of the block bvp. The chosen predictor block is identified from the bvp_flag syntax. If the bvp_flag is 0, then the first candidate of the predictor list is the predictor of the current block. Otherwise, the second candidate.

Thus, at the decoder, by is reconstructed as:

$$bv = bvd + bvp \qquad [1]$$

According to a particular IBC adoption [4], the BM search of IBC is restricted to the current CTU (Coding Tree Unit) and some portions of the left CTU, depending on the position of the current block in the current CTU.

IBC performs exceptionally well for screen content or screen content-like sequences. This is possibly due the fact that it is easy to find a good match for the current block in the current reconstructed frame for such video sequences as they have sharper edges and repetitive content. However, the coding efficiency of IBC for natural sequences is relatively lower compared to screen content sequences. Further, the encoding complexity of IBC is high due to the BM search algorithm.

There is no complexity increase at the decoder side for IBC, as the displacement information of the chosen block is sent to the decoder and no complex computations are carried out at the decoder.

However, it would be desirable to provide a coding scheme which improves the above mentioned drawbacks related with IBC, and for achieving a better trade-off between the coding gain and encoder complexity.

According to the invention, this problem is solved by the decoder according to the independent claims, as well as by the respective methods of decoding according to the independent claims.

SUMMARY

An embodiment may have an encoder for block-based encoding a picture into a data stream, wherein the encoder is configured to determine for a current block of the picture a difference between a first predetermined block and a second predetermined block inside a block search area, and to encode said difference into the data stream, wherein the encoder is further configured to partition the block search area into multiple block search regions.

Another embodiment may have a decoder for block-based decoding a picture from a data stream, wherein the decoder is configured to reconstruct a current block of the picture based on a difference between a first predetermined block and a second predetermined block inside a block search area, wherein the decoder is configured to derive said difference from the data stream, wherein the decoder is further configured to partition the block search area into multiple block search regions.

Another embodiment may have a system comprising the inventive encoder and the inventive decoder.

Another embodiment may have a method for block-based encoding a picture into a data stream, the method comprising reconstructing a current block of the picture based on a difference between a first predetermined block and a second predetermined block inside a block search area, and encoding said difference into the data stream, wherein the block search area is partitioned into multiple block search regions.

Another embodiment may have a method for block-based decoding a picture from a data stream, wherein the method comprises reconstructing a current block of the picture based on a difference between a first predetermined block and a second predetermined block inside a block search area, wherein said difference is derived from the data stream, wherein the block search area is partitioned into multiple block search regions.

Another embodiment may have a non-transitory digital storage medium having a computer program stored thereon to perform the method for block-based encoding a picture into a data stream, the method comprising reconstructing a current block of the picture based on a difference between a first predetermined block and a second predetermined block inside a block search area, and encoding said difference into the data stream, wherein the block search area is partitioned into multiple block search regions, when said computer program is run by a computer.

Another embodiment may have a non-transitory digital storage medium having a computer program stored thereon to perform the method for block-based decoding a picture from a data stream, wherein the method comprises reconstructing a current block of the picture based on a difference between a first predetermined block and a second predetermined block inside a block search area, wherein said difference is derived from the data stream, wherein the block search area is partitioned into multiple block search regions, when said computer program is run by a computer.

Another embodiment may have a data stream acquired by a method for block-based encoding a picture into a data stream, the method comprising reconstructing a current block of the picture based on a difference between a first predetermined block and a second predetermined block inside a block search area, and encoding said difference into the data stream, wherein the block search area is partitioned into multiple block search regions.

Another embodiment may have a data stream acquired by a method for block-based decoding a picture from a data stream, wherein the method comprises reconstructing a current block of the picture based on a difference between a first predetermined block and a second predetermined block inside a block search area, wherein said difference is derived from the data stream, wherein the block search area is partitioned into multiple block search regions.

A first aspect concerns an encoder for block-based encoding a picture into a data stream, wherein the encoder is configured to determine for a current block of the picture a difference between a first predetermined block and a second predetermined block inside a block search area, and to encode said difference into the data stream, wherein the encoder is further configured to partition the block search area into multiple block search regions.

In the sense of the present disclosure, a block may comprise a predetermined number of samples, or in other words, a block may comprise a predetermined size, e.g. M×N, wherein M may denote a number of samples arranged in a row and N may denote a number of samples arranged in a column. Accordingly, a block may also be referred to as a block of samples. Furthermore, a block that is to be currently coded will be referred to herein as a current block. In case a predictive coding scheme is used, a current block may be a block that is to be currently predicted.

As mentioned above, the inventive principle provides for an encoder that is capable of encoding a current block based on a difference between a first predetermined block and a second predetermined block. Said difference may, for example, be a mathematical, a spatial or a temporal difference. For determining said difference, the encoder may search and find a suitable second predetermined block inside a block search area. The first predetermined block may already be known to the encoder so that the encoder may determine the difference between the already known first predetermined block and the found second predetermined block. In the above described conventional IBC, the block search area may be relatively large. Accordingly, the search for a suitable second predetermined block inside said large block search area may be time consuming. Furthermore, since only two candidates for a first predetermined block may be available inside the entire search area in conventional IBC, it may happen that the difference (e.g. a spatial distance) between a second predetermined block and a first predetermined block may also be relatively large. Thus, coding efficiency may suffer accordingly. In turn, according to the invention, the block search area may be partitioned into one or more block search regions. A block search region is a sub-unit of the entire block search area. Thus, a block search region may be equally sized or advantageously be smaller than the entire block search area. Each block search region may comprise its own first predetermined block and its own second predetermined block. Accordingly, a difference (e.g. a spatial distance) between the second predetermined block inside one particular block search region and the first predetermined block inside the same block search region may be considerably smaller compared to searching the entire block search area as in conventional IBC. In other words, the magnitude of the difference determined by the inventive concept may be considerably smaller as the magnitude of the difference determined by conventional IBC. Since said difference is encoded, coding efficiency may significantly increase compared to conventional IBC.

A second aspect concerns a decoder for block-based decoding a picture from a data stream, wherein the decoder is configured to reconstruct a current block of the picture based on a difference between a first predetermined block and a second predetermined block inside a block searching area, wherein the decoder is configured to derive said difference from the data stream, wherein the decoder is further configured to partition the block searching area into multiple block searching regions. As mentioned above, each block search region may comprise its own first predetermined block and its own second predetermined block. The difference derived from the data stream may be associated with one particular block search region. Accordingly, the decoder may also be configured to derive from the data stream an index for indicating the respective (i.e. correct) block search region to which the first and second predetermined blocks and their transmitted difference belongs. In other words, the decoder may derive from the data stream data indicating a particular block search region and data indicating the difference belonging to this particular block search region. Thus, no complex calculations have to be executed at the decoder side.

A third aspect concerns a method for block-based encoding a picture into a data stream, the method comprising steps of reconstructing a current block of the picture based on a difference between a first predetermined block and a second predetermined block inside a block search area, and encoding said difference into the data stream, wherein the block search area is partitioned into multiple block search regions.

A fourth aspect concerns a method for block-based decoding a picture from a data stream, wherein the method comprises steps of reconstructing a current block of the picture based on a difference between a first predetermined block and a second predetermined block inside a block searching area, wherein said difference is derived from the data stream, wherein the block search area is partitioned into multiple block search regions.

According to a fifth aspect, computer programs are provided, wherein each of the computer programs is configured to implement the above-described methods when being executed on a computer or signal processor, so that the above-described methods are implemented by one of the computer programs.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
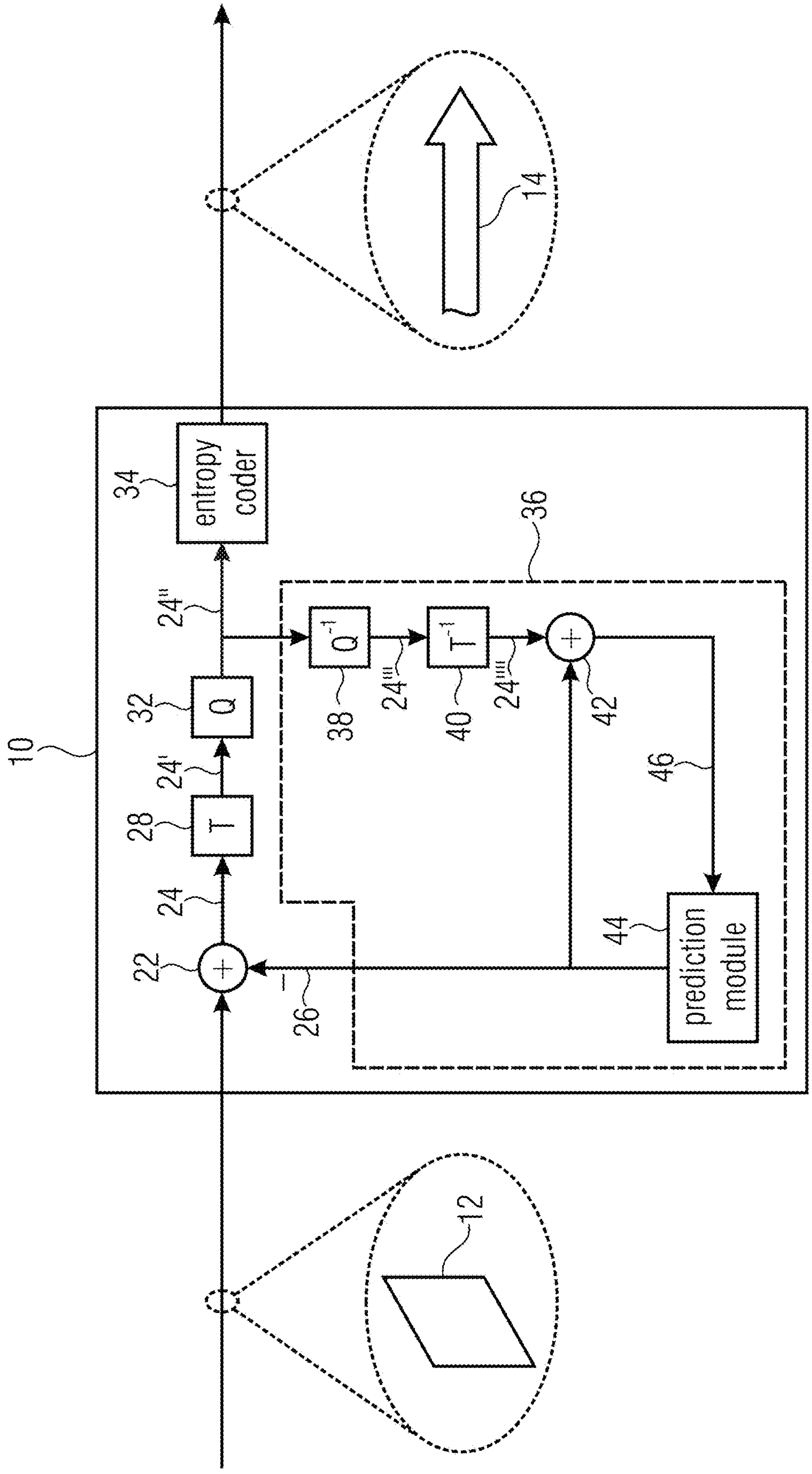
FIG. 1 shows a schematic block diagram of a general concept of a block-based encoder.

Equal or equivalent elements or elements with equal or equivalent functionality are denoted in the following description by equal or equivalent reference numerals.

Method steps which are depicted by means of a block diagram and which are described with reference to said block diagram may also be executed in an order different from the depicted and/or described order. Furthermore, method steps concerning a particular feature of a device may be replaceable with said feature of said device, and the other way around.

The following description of the figures starts with a presentation of a description of an encoder and a decoder of a block-based predictive codec for coding pictures of a video in order to form an example for a coding framework into which embodiments of the present invention may be built in.

Figure 2:
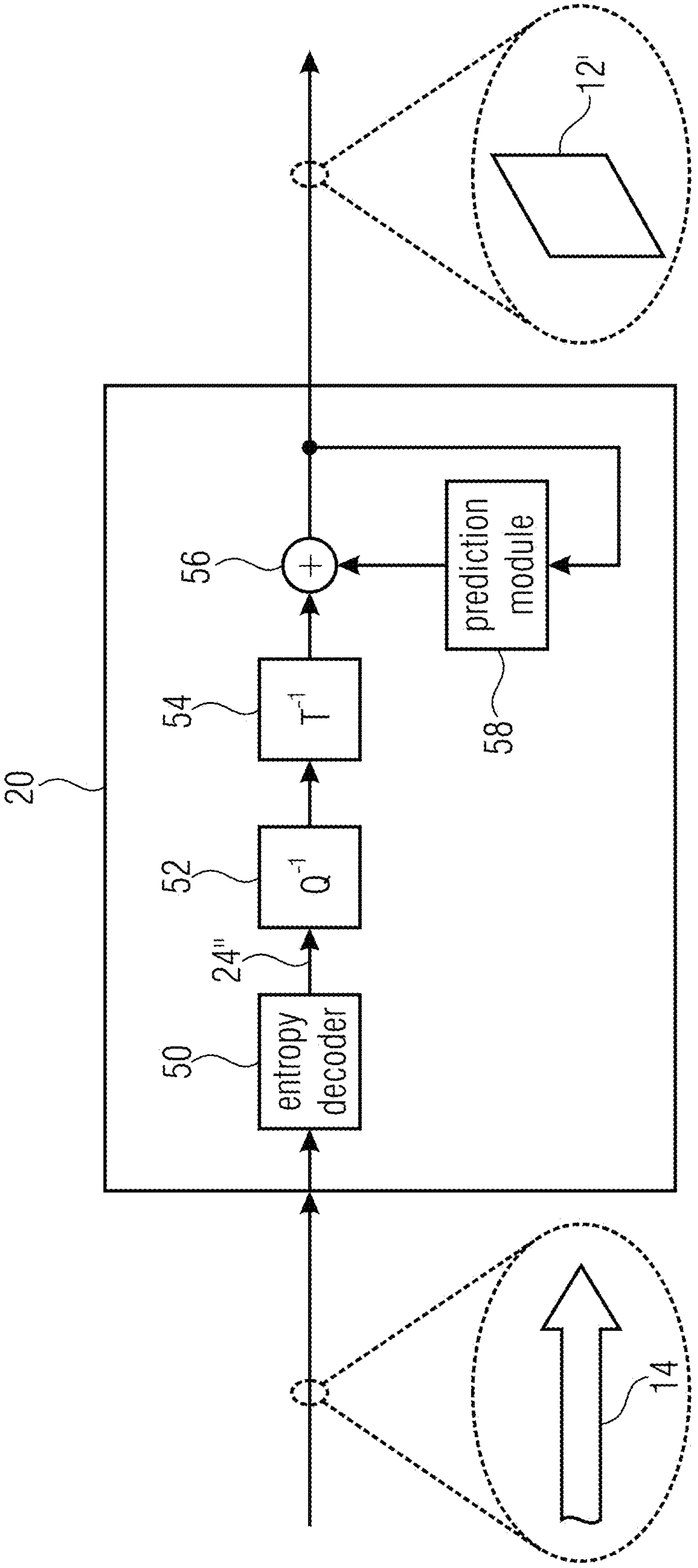
FIG. 2 shows a schematic block diagram of a general concept of a block-based decoder.
Figure 3:
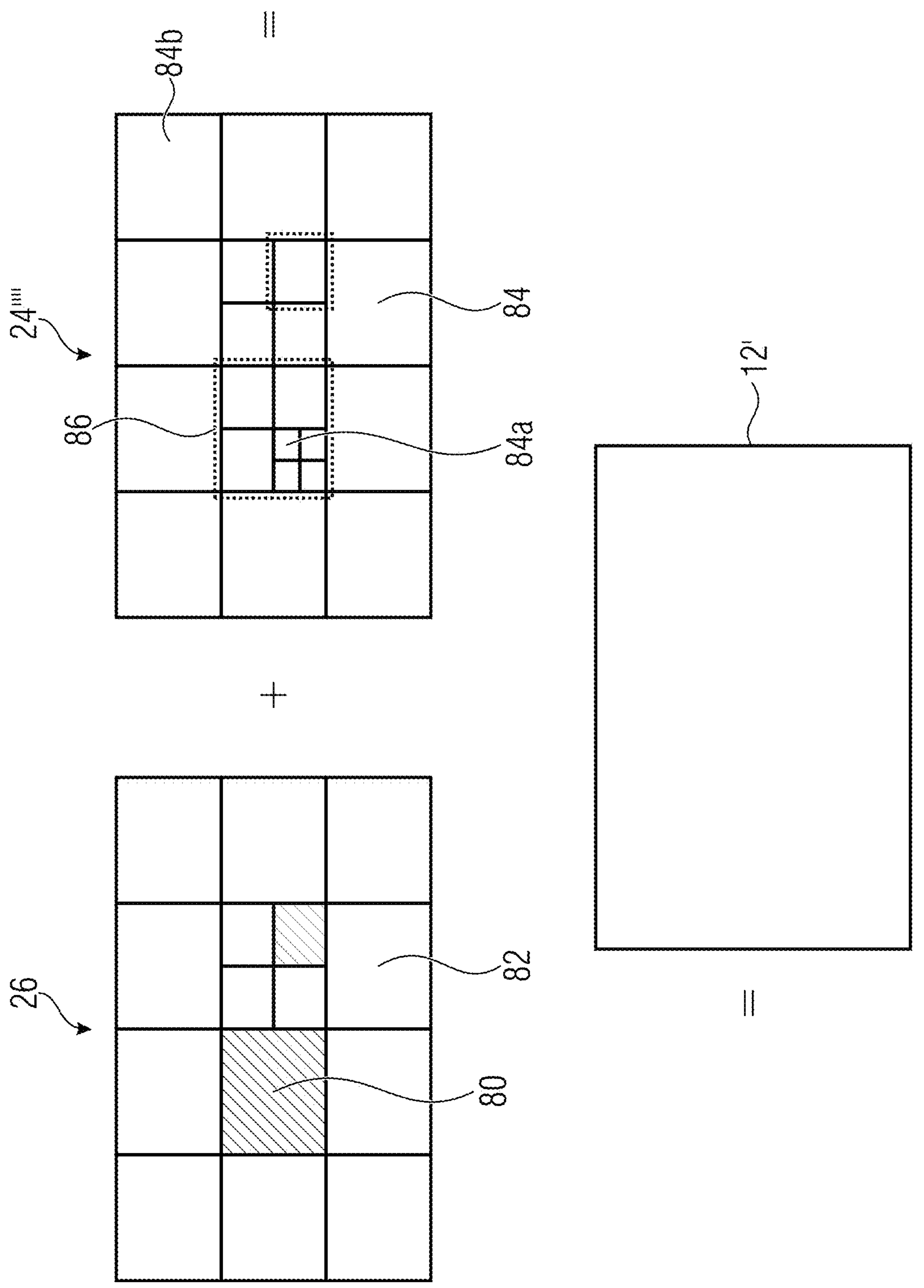
FIG. 3 shows a schematic drawing of blocks that can be processed in block-based coding.

The respective encoder and decoder are described with respect to FIGS. 1 to 3. Thereinafter the description of embodiments of the concept of the present invention is presented along with a description as to how such concepts could be built into the encoder and decoder of FIGS. 1 and 2, respectively, although the embodiments described with the subsequent FIG. 4 and following, may also be used to form encoders and decoders not operating according to the coding framework underlying the encoder and decoder of FIGS. 1 and 2.

FIG. 1 shows an apparatus for predictively coding a picture 12 into a data stream 14 exemplarily using transform-based residual coding. The apparatus, or encoder, is indicated using reference sign 10. FIG. 2 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. from the picture 12. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24'' is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24'' encoded into, and decodable from, data stream 14. To this end, the prediction stage 36 may internally, as is shown in FIG. 1, comprise a dequantizer 38 which dequantizes prediction residual signal 24'' so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal

12. Reconstructed signal 46 may correspond to signal 12'. A prediction module 44 of prediction stage 36 then generates the prediction signal 26 on the basis of signal 46 by using, for instance, spatial prediction, i.e. intra-picture prediction, and/or temporal prediction, i.e. inter-picture prediction.

Likewise, decoder 20, as shown in FIG. 2, may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 2, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial distance of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24", data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

FIG. 3 illustrates the relationship between the reconstructed signal, i.e. the reconstructed picture 12', on the one hand, and the combination of the prediction residual signal 24"" as signaled in the data stream 14, and the prediction signal 26, on the other hand. As already denoted above, the combination may be an addition. The prediction signal 26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 3 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24"" in FIG. 3 is also illustrated as a subdivision of the picture area into blocks 84. These blocks might be called transform blocks in order to distinguish same from the coding blocks 80 and 82. In effect, FIG. 3 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 3 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 3 further illustrates that the combination of the prediction signal 26 and the prediction residual signal 24"" directly results in the reconstructed signal 12'. However, it should be noted that more than one prediction signal 26 may be combined with the prediction residual signal 24"" to result into picture 12' in accordance with alternative embodiments.

In FIG. 3, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform

DST-IV, where DST stands for Discrete Sine Transform

DCT-IV

DST-VII

Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)

Inverse DST-IV

Inverse DCT-IV

Inverse DST-VII

Identity Transformation (IT)

The subsequent description provides more details on which transforms could be supported by encoder 10 and decoder 20. In any case, it should be noted that the set of supported transforms may comprise merely one transform such as one spectral-to-spatial or spatial-to-spectral transform.

As already outlined above, FIGS. 1 to 3 have been presented as an example where the inventive concept described further below may be implemented in order to form specific examples for encoders and decoders according to the present application. Insofar, the encoder and decoder of FIGS. 1 and 2, respectively, may represent possible implementations of the encoders and decoders described herein below. FIGS. 1 and 2 are, however, only examples. An encoder according to embodiments of the present application may, however, perform block-based encoding of a picture 12 using the concept outlined in more detail below and being different from the encoder of FIG. 1 such as, for instance, in that same is no video encoder, but a still picture encoder, in that same does not support inter-prediction, or in that the sub-division into blocks 80 is performed in a manner different than exemplified in FIG. 3. Likewise, decoders according to embodiments of the present application may perform block-based decoding of picture 12' from data stream 14 using the coding concept further outlined below, but may differ, for instance, from the decoder 20 of FIG. 2 in that same is no video decoder, but a still picture decoder, in that same does not support intra-prediction, or in that same sub-divides picture 12' into blocks in a manner different than described with respect to FIG. 3 and/or in that same does not derive the prediction residual from the data stream 14 in transform domain, but in spatial domain, for instance.

Initially, a brief introduction to intra prediction shall be given by explaining the so-called Intra Block Copy (IBC) of conventional technology. As exemplarily shown in FIG. 11, conventional Intra Block Copy (IBC) is one of the intra prediction methods used in the HEVC Screen content Coding (SCC) extensions [1]. This approach is also adopted into H.266/Versatile Video coding [2]. At the encoder side, the aforementioned method searches for a similar block 112 for the original block 110 in the current reconstructed picture. Said similar block 112 is searched during the BM search inside a search area 140 that may be relatively large. An error minimizing metric (sum of absolute differences (SAD) in this case) is used for the block matching (BM) algorithm. During the BM search, integer sample positions inside the search area 140 are checked for finding the best match for the current original block 110 by calculating the SAD between the two blocks 110, 112. The block 112 that gives the least SAD error is considered as the best match for the original block 110 and it is called the prediction block 112, as exemplarily shown in FIG. 11. The relative displacement from the current block 110 to that of the prediction block 112 is called the block vector bv. Since transmitting the complete block vector may use a large number of bits, predictive coding of the block vector is used. This may be similar to the predictive coding of the motion vector of the normal inter method.

IBC is a current picture referencing tool, which is different from the typical intra or inter prediction methods. Therefore, a new prediction mode called MODE_IBC is introduced into the bitstream apart from the normal MODE_INTER and MODE_INTRA [3].

The encoder and decoder maintains a predictor list for the purpose of block vector coding (similar to motion vectors in normal inter mode). The block vectors from the neighbouring blocks are utilized for generating this predictor list. Thus, a predictor block 111 is also a block present anywhere in the search area 140. The maximum number of candidates in the predictor list is two.

Figure 11:
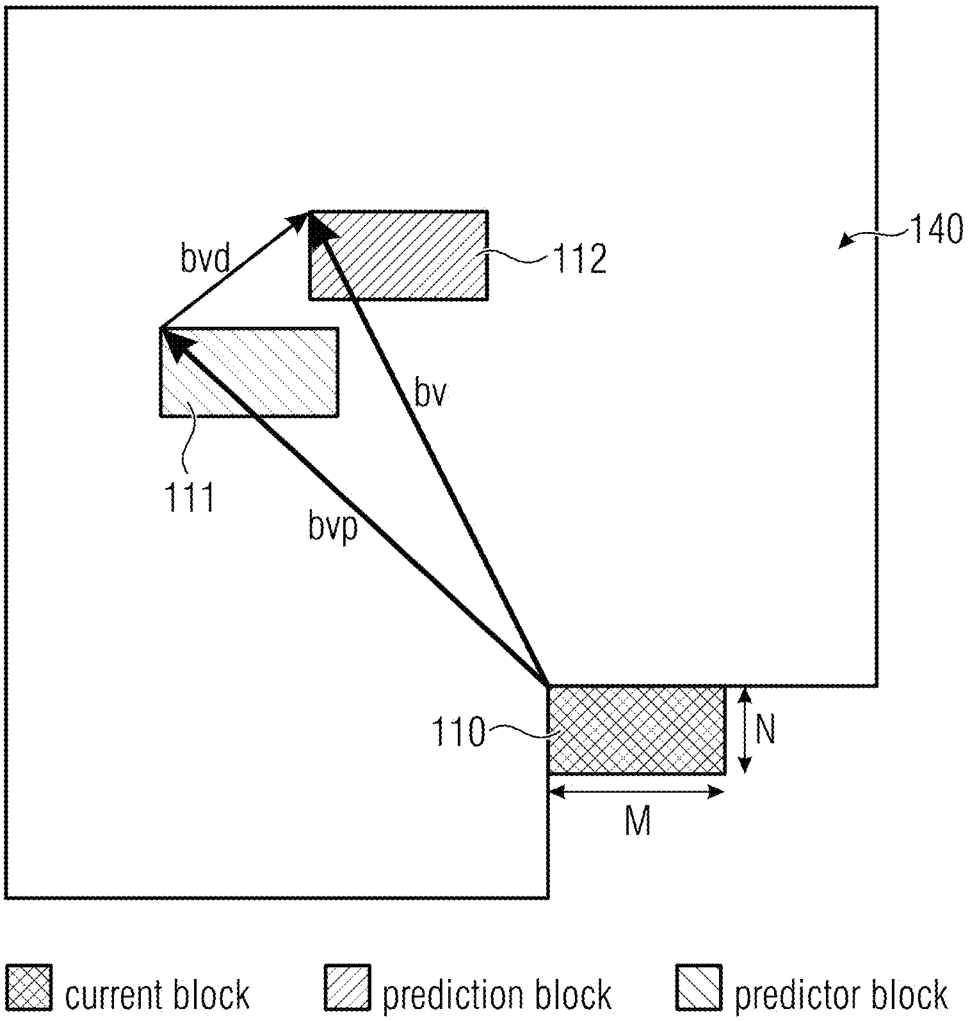
FIG. 11 shows a schematic block diagram of Intra Block Copy according to conventional technology.

As shown in FIG. 11, if the block vector of the prediction block 112 is bv and the block vector of the predictor block 111 is bvp, then the difference between them, which may be referred to as the differential vector bvd, is signalled to the decoder. The encoder estimates the bits that may be used for signalling bvd using each of the two candidates in the predictor list. The candidate that may use the least number of bits is regarded as the final predictor block 111 of the vector bvp. The chosen predictor block 111 is identified from the bvp_flag syntax. If the bvp_flag is '1', then the first candidate of the predictor list is the predictor of the current block 110. Otherwise, the second candidate.

Thus, at the decoder, bv is reconstructed as:

$$bv = bvd + bvp \qquad [1]$$

However, due to the large search area 140 and the fact that only two candidates may be available but spread over the whole search area 140, the differential vector bvd may be large and, thus, coding efficiency may suffer accordingly.

The present invention provides a solution for achieving a better trade-off between the coding gain and encoder complexity by providing a region-based approach for intra block copy. Thus, the innovative principle disclosed herein will also be referred to as a region-based intra block copy (RIBC) which may use a difference between a first predetermined block (predictor block) 111 and a second predetermined block (prediction block) 112, but wherein the search area 140 may be divided into smaller sub-areas, which may also be referred to as block search regions.

Figure 4:
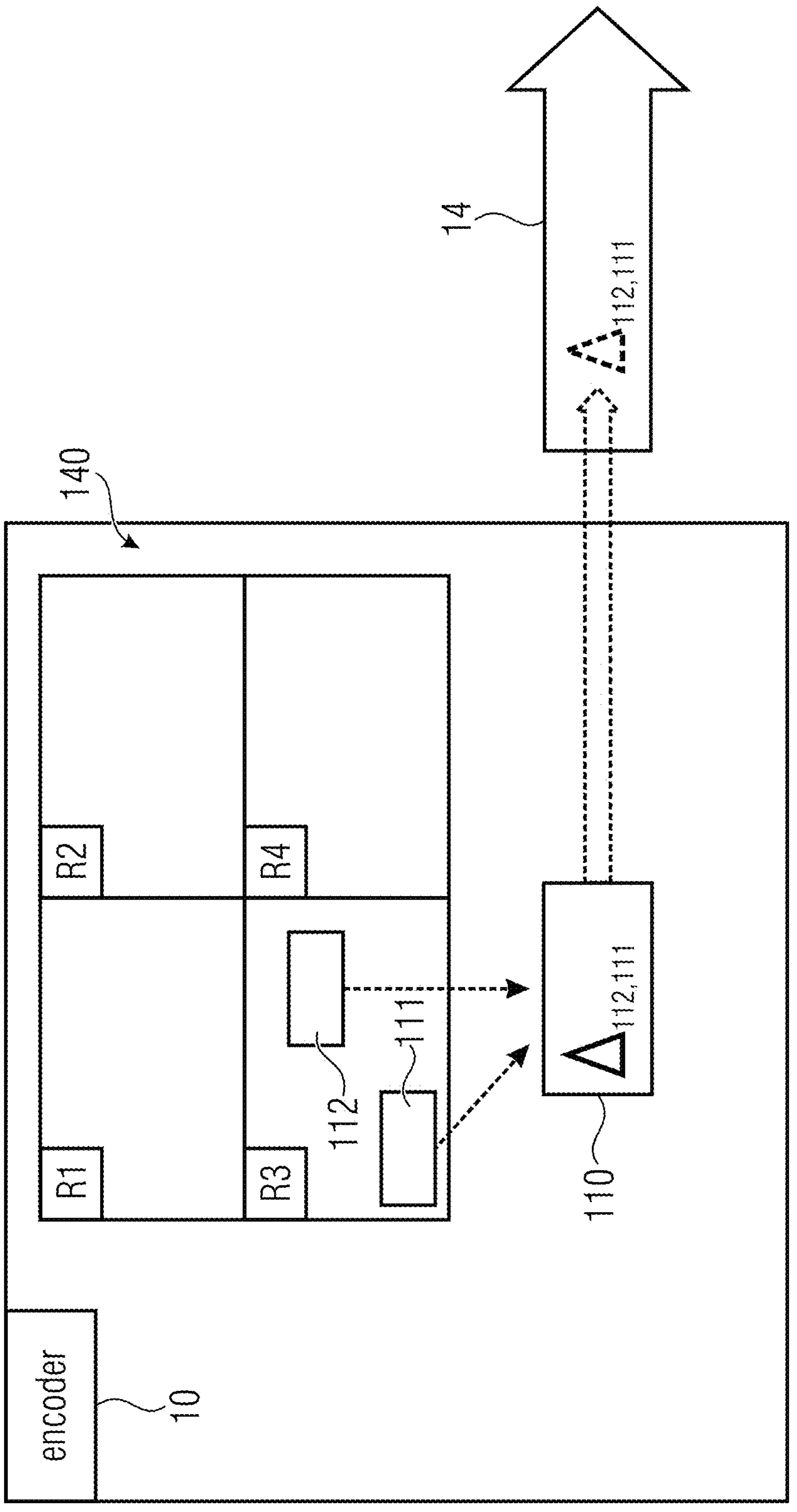
FIG. 4 shows a schematic block diagram of a block-based encoder according to an embodiment.

FIG. 4 shows a non-limiting example of an inventive encoder 10 which is configured to partition a block search area 140 into a plurality of block search regions, which block search regions will generally be referenced herein with Ri. In the non-limiting example depicted in FIG. 4, the encoder 10 may be configured to partition the block search area 140 into four block search regions R1, R2, R3, R4. For encoding a current block 110, the encoder 10 may exploit a first predetermined block 111 and a second predetermined block 112. Said first and second predetermined blocks 111, 112 may be searched by the encoder 10 inside a block search area 140. According to the invention, the encoder 10 may be configured to partition the block search area 140 into one or more block search regions R1, R2, R3, R4.

The encoder 10 may be configured to search for the first and second predetermined blocks 111, 112 inside said block search regions R1, R2, R3, R4. Each of the block search regions R1, R2, R3, R4 may comprise its own first predetermined block 111 and its own second predetermined block 112.

The encoder 10 may search for a suitable second predetermined block 112 that is suitable for encoding the current block 110. A suitable second predetermined block 112 may be one second predetermined block 112 that matches the current block 110 to a certain extent, advantageously one second predetermined block 112 that best matches the current block 110. Thus, this search may also be referred to as a Block Matching (BM) search.

The encoder 10 may conduct a BM search, i.e. the encoder 10 may search for such a suitable second predetermined block 112, inside the block search regions R1, R2, R3, R4. The encoder 10 may search inside at least one, and advantageously inside each of the block search regions R1, R2, R3, R4. The encoder 10 may find a suitably matching second predetermined block 112 inside one of the block search regions R1, R2, R3, R4. In the non-limiting example depicted in FIG. 4, the encoder 10 found a suitably matching second predetermined block 112 inside the third block search region R3.

The encoder 10 may be aware of the first predetermined block 111 belonging to the third block search region R3 and, thus, the encoder 10 may calculate a difference $\Delta_{112,\ 111}$ between the first and second predetermined blocks 111, 112 inside the third block search region R3. For encoding the current block 110, it may be sufficient that the inventive encoder 10 may encode the above mentioned difference $\Delta_{112,\ 111}$ into the data stream 14.

Optionally, the encoder 10 may additionally or alternatively encode a region-index i into the data stream 14 for indicating the respective block search region in which the difference $\Delta_{112,\ 111}$ was calculated. In this example the difference $\Delta_{112,\ 111}$ was calculated in R3. Thus, a region index i indicating block search region R3 may be optionally encoded into the data stream 14. The optional region index i will be described in more detail somewhat later in the text.

However, as can be seen in FIG. 4, the first predetermined block 111 and the second predetermined block 112 may both be located inside a same block search region R1-R4, in this example in block search region R3. This reduces the need for searching the second predetermined block inside the entire block search area 140.

As mentioned before, the encoder 10 may search for a suitably matching second predetermined block 112 that is suitable for encoding the current block 110, which search may also be referred to as Block Matching (BM) search. For example, a second predetermined block 112 which is similar to the current block 110 may be considered as a suitable matching block. Said similarity may be determined based on the similarity of certain criteria, such as similar picture features comprised by a block, e.g. chroma, luma, size, color, etc.

For determining a similarity between the current block 110 and one or more available candidate second predetermined blocks 112, the encoder 10 may be configured to apply an error minimizing metric. For example, the encoder 10 may calculate the sum of absolute differences (SAD) between the current block 110 and one or more candidate second predetermined blocks 112. At least one second predetermined block 112 that has a similarity to the current block 110, which similarity is at or above a predetermined similarity-threshold may be elected as the second predetermined block 112 for encoding. For example, that one second predetermined block 112 that comprises the least SAD from all tested candidate second predetermined blocks 112, may be elected. Accordingly, the elected second predetermined block 112 has the biggest similarity to the current block 110, or in other words, the elected second predetermined block 112 has a similarity to the current block 110, which similarity lies at or above the similarity-threshold.

Summarizing, some embodiments may provide for an encoder 10 that is configured to search for the second predetermined block 112 in at least one of the multiple block search regions R1-R4, or in each of the multiple block search regions R1-R4. If the encoder found the second predetermined block 112 in one of the multiple block search regions R1-R4, the encoder 10 may be configured to identify said one block search region R3, in which the second predetermined block 112 was found.

Furthermore, the encoder may be configured to optionally encode a region-index i associated with said identified one block search region R3 into the data stream 14.

As mentioned above, each block search region R1-R4 may comprise its own first predetermined block 111. The first predetermined block 111 of each block search region R1-R4 may be known to the encoder 10. The first predetermined block 111 may be any block inside the respective block search region R1-R4. In the present example, the first predetermined block 111 belonging to the third block search region R3 may be located at a predetermined sample position inside the third block search region R3. Said predetermined sample position being known to the encoder 10. As exemplarily depicted in FIG. 4, the predetermined sample position may be the bottom left corner of block search region R3. However, the predetermined sample position may be located anywhere inside the respective block search region R3, but it should be known to the encoder 10.

In some other exemplary embodiments, which will be discussed in more detail somewhat later in the text, the predetermined sample position indicating the position of the first predetermined block 111 inside a respective one of the block search regions R1-R4 may be located at the center of the respective one of the block search regions R1-R4. This may be advantageous because, when the first predetermined block 111 is located in the center, then the maximum spatial displacement or spatial distance between the first predetermined block 111 and the second predetermined block 112 inside the same block search region R1-R4 may be minimized.

According to some embodiments, said spatial distance may represent the difference between the first and second predetermined blocks 111, 112 and this difference may be encoded into the data stream 14 by the encoder 10 in order to encode the current block 110. Accordingly, the encoder 10 may be configured to determine a spatial distance or spatial displacement between the first and second predetermined blocks 111, 112 and the encoder 10 may encode said determined spatial distance or spatial displacement into the data stream 14.

According to some examples, the encoder 10 may be configured to use predictive coding, wherein the first predetermined block 111 may be a predictor block, the second predetermined block 112 may be a prediction block, and the current block 110 may be a block to be predictively encoded based on at least one of the predictor block 111 and the prediction block 112.

Figure 5:
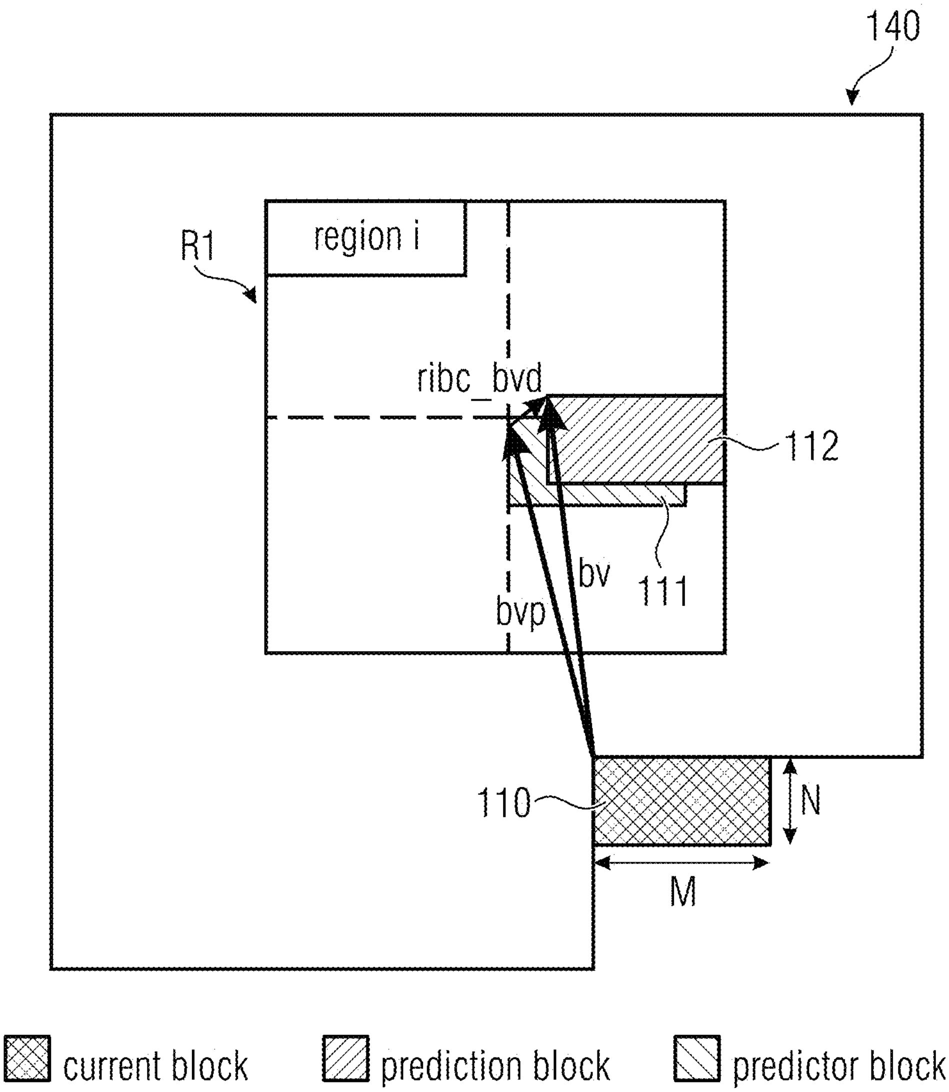
FIG. 5 shows a schematic drawing of Region-Based Intra Block Copy according to an embodiment.

FIG. 5 shows an example of such a predictive coding scheme. This non-limiting example is based on the above discussed Intra Block Copy (IBC) coding scheme, however, extended by the inventive principle of partitioning the block search area 140 into one or more block search regions R1-R4. Thus, the inventive principle may also be referred to as a Region Based Intra Block Copy (RIBC).

As can be seen in FIG. 5, a current block 110 is to be coded by the inventive encoder 10 and decoder 20, respectively, using the inventive principle of RIBC. The current block 110 may comprise a predetermined size of M×N samples. The current block 110 may be predictively coded, based on a prediction block and a predictor block. In this example, the first predetermined block 111 may be a predictor block and the second predetermined block 112 may be a prediction block.

The encoder 10 may search for a suitably matching prediction block 112 which is suitable for predictively coding the current block 110. A suitably matching prediction block, i.e. a suitably matching second predetermined block 112, may be found for example by means of SAD. According to the inventive principle of RIBC, the block search area 140, in which one or more candidate prediction blocks 112 can be found, may be partitioned into one or more block search regions, wherein region R1 is depicted as an example. The encoder 10 may find a suitably matching second predetermined block 112, i.e. a suitably matching prediction block, inside region R1.

The found second predetermined block 112 may be signaled by means of a block vector bv. The block vector bv may represent a spatial distance between the current block 110 and the found second predetermined block 112 (prediction block).

As mentioned above, each block search region Ri may comprise its own first predetermined block 111, i.e. its own predictor block. The position of the predictor block 111 inside the respective block search region Ri is known to the encoder 10. In the non-limiting example depicted in FIG. 5, the integer position of the predictor block 111 is the center of the block search region Ri. In other words, the predictor block 111 is a center block. The known first predetermined block 111 (predictor block) may be signaled by means of a block vector bvp. The block vector bvp may represent a spatial distance between the current block 110 and the known first predetermined block 111 (predictor block).

According to such an embodiment, the encoder 10 may be configured to apply a block-vector-based signaling and to determine a first block vector bvp and a second block vector bv, the first block vector bvp indicating a relative spatial distance between the current block 110 and the first predetermined block 111, and the second block vector by indicating a relative spatial distance between the current block 110 and the second predetermined block 112.

The inventive encoder 10 may further be configured to determine a spatial distance or a spatial displacement between the first and second predetermined blocks 111, 112. In this example, the spatial displacement may be represented by the differential vector ribc_bvd that may be calculated by the encoder 10 as $$\text{ribc\_byd} = bv - bvp$$

The differential vector ribc_bvd=bv−bvp may represent the difference ($\Delta_{111,\ 112}$) that is encoded by the encoder 10 into the data stream 14. In particular, the differential vector ribc_bvd=bv−bvp may represent a relative spatial distance or spatial displacement between the first and second predetermined blocks 111, 112.

The encoder 10 may be configured to apply the inventive principle of RIBC, i.e. partitioning the block search area 140 into multiple block search regions Ri, on a coding-block level and/or on a coding-subblock level. A coding-block may, for instance, be a Coding Tree Unit (CTU). A coding-block may be partitioned into two or more coding-sub-blocks. A coding-subblock may, for instance, be a Coding Unit (CU).

The non-limiting examples described herein may be implemented on Versatile Video Coding (VVC) reference software (VTM), where the CTUs are coded from left to right. As exemplarily shown in FIG. 6, after a first split (which is a quad split in this example) on the CTU 150, four equally sized CUs 151, 152, 153, 154 are formed. The four CUs 151-154 are coded one by one in a Z-scan order, starting at the upper left corner, i.e. at the first CU 151. Due to this particular scan order, the search area 140 which is available for the BM search depends on the position of the current block (not shown) inside the CTU 150.

For example, if the current block 110 would be located inside the second CU 152 the BM search cannot be conducted in the third CU 153 (also not in the fourth CU 154) because the third and fourth CUs 153, 154 have not yet been coded. However, if the current block 110 would be located inside the third CU 153, the BM search can be conducted in the second CU 152 (and also in the first CU 151) since the first and second CUs 151, 152 have already been coded before.

Thus, the number of regions being available to a current block 110 for conducting a BM search may generally depend on the position of the current block 110 inside the current CTU 150. As a further example, if the current block 110 would be in the first position of a first CTU in a picture, then no regions would be available as there is no area for the BM search. Further, the borders of a block search region Ri may also depend on the position of the current block 110. However, the maximum size of a block search region Ri may remain the same (for example, k=35).

Figure 7:
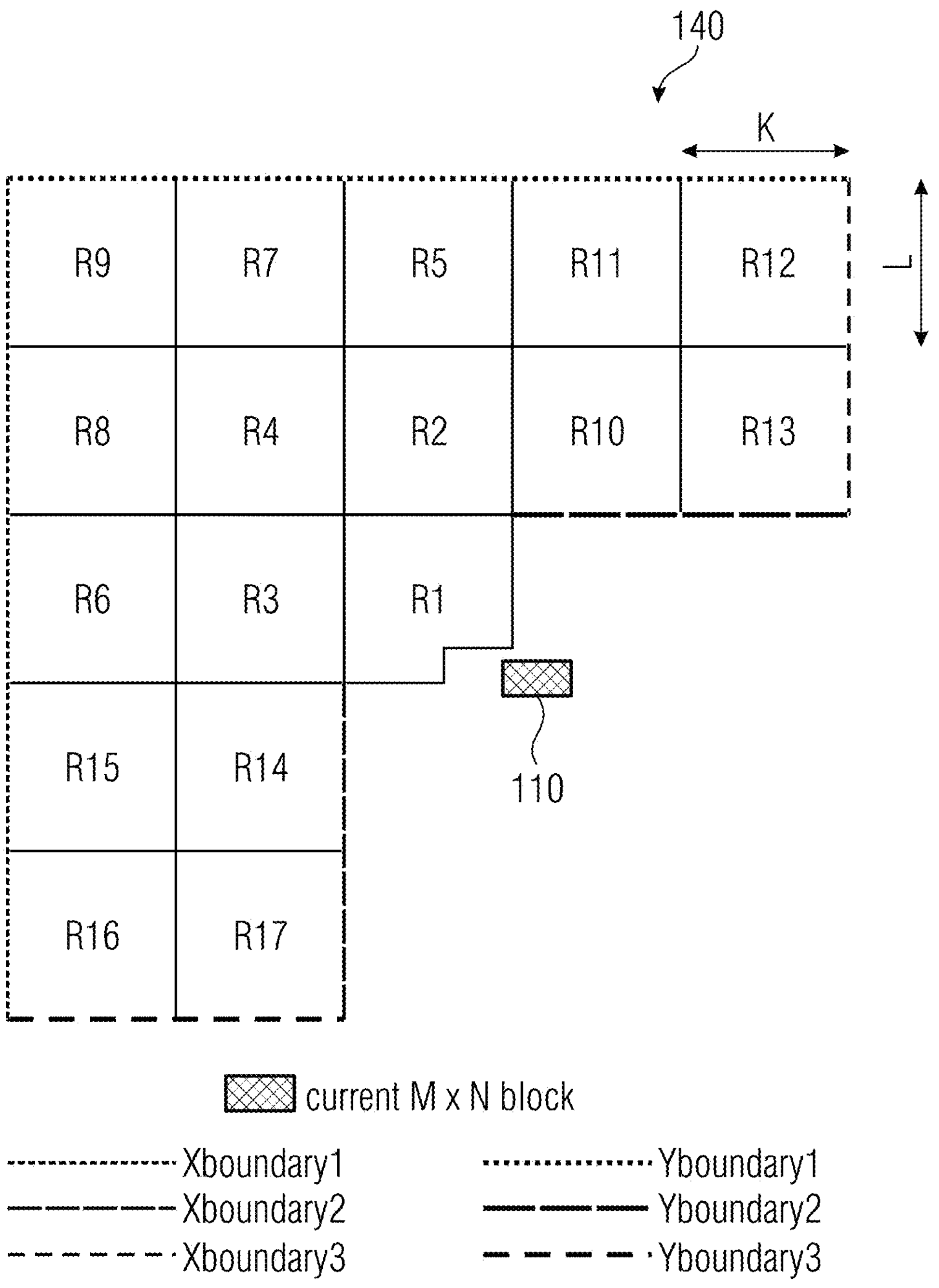
FIG. 7 shows a schematic diagram of a block search area being divided into a plurality of block search regions according to an embodiment.

Before discussing further examples in detail, it shall initially be referred to FIG. 7. It shows a search area 140 being partitioned exemplarily into seventeen different block search regions R1 to R17. A current block 110 may have a size of M×N samples. The block search regions R1 to R17 may comprise a size of K×L samples. In the example shown in FIG. 7, each of the block search regions R1 to R17 comprises the same size being K×L. However, it may also be possible that the block search regions R1 to R17 may comprise differing sizes. Furthermore, the size of the current block 110 may be smaller than the block search regions R1 to R17 (as exemplarily depicted), greater than the block search regions R1 to R17, or it may comprise the same size as the block search regions R1 to R17.

Furthermore, as mentioned before, the borders of the block search regions R1 to R17 may depend on the position of the current block 110 inside a current CTU. As can be seen in FIG. 7, one or more borders along the x-axis and one or more borders along the y-axis may be defined. Yet further, the block search regions R1 to R17 may be square-shaped, as exemplarily depicted in FIG. 7, or may be rectangular.

The block search regions R1 to R17 may be arranged such that they are adjoining each other. Accordingly, there may be no gap between them. However, their borders may be shifted, which will be explained later with reference to FIGS. 8A to 8D.

Summarizing, the encoder 10 may be configured to partition the block search area 140 into a number of n block search regions (here: R1 to R17) of a predetermined size K×L. How these block search regions R1 to R17 can be applied inside a CTU, depending on the position of the current block 110, shall be explained by means of some non-limiting examples with reference to FIGS. 8A to 8D.

FIGS. 8A to 8D show an example of a current CTU 150, i.e. a coding block that is to be currently coded, and a left CTU 150', i.e. a coding block that has previously been coded. As explained above, the BM search may be conducted in those block search regions R1 to R17 in which samples have already been coded before. In the examples of FIGS. 8A to 8D, a z-scan order (see FIG. 6) was applied. As also mentioned above, the available block search regions Ri may depend on the position of the current block 110 inside the current CTU 150.

Figure 8A:
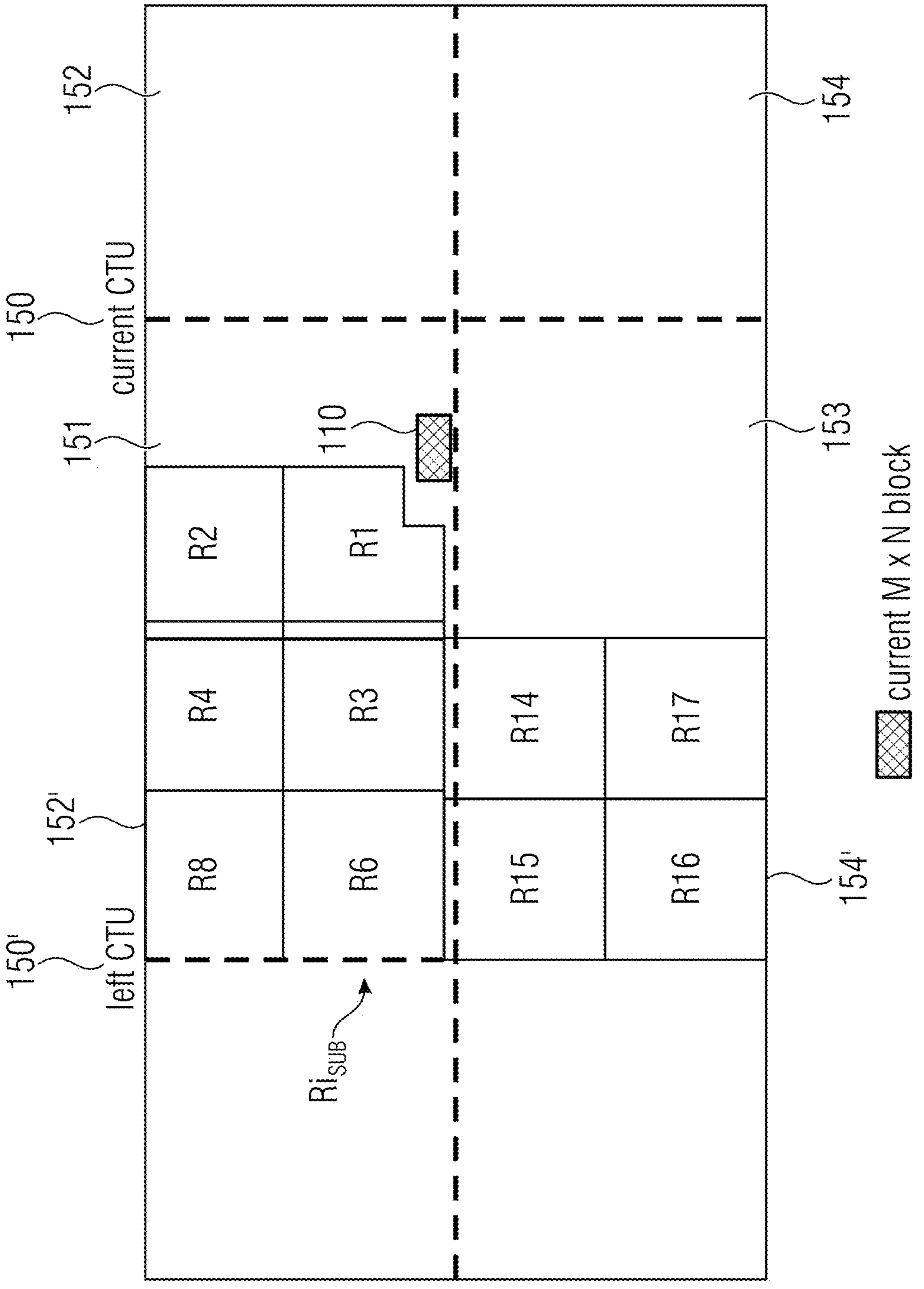
FIG. 8A shows a schematic diagram of available block search regions in a predefined subset of block search regions according to an embodiment, wherein the current block is located in the first quadrant of the current CTU.

FIG. 8A shows an example in which the current block 110 is located in the first CU (coding-subblock) 151. As can be seen, depending on the position of the current block 110 inside the current CTU 150, not all of the above described block search regions R1 to R17 (see FIG. 7) may be available, but only a subset $Ri_{SUB}$ of these block search regions R1 to R17 may be available. In this case, a subset $Ri_{SUB}$ containing regions R1 to R4, R6, R8 and R14 to R17 may be available. The reason for this shall be explained in the following.

As mentioned above, only those regions Ri may be available for the BM search, in which regions Ri previously coded samples are contained. For instance, samples contained in the regions R1 and R2 inside the first CU 151 of the current CTU 150 have already been coded before. Thus, they may be used for the BM search. Moreover, also samples inside the left CTU 150' may have already been coded before. In the present example, the samples contained in the second CU 152' and in the fourth CU 154' of the left CTU 150' may have been previously coded. Thus, the depicted regions R3, R4, R6, and R8 may be available for the BM search, since they are arranged inside the previously coded second CU 152' of the left CTU 150'. Additionally, also the regions R14 to R17 may be available for the BM search, since they are arranged inside the previously coded fourth CU 154' of the left CTU 150'.

Accordingly, embodiments may provide an encoder 10 wherein, for a current block 110 to be currently coded, the encoder 10 is configured to select a predefined subset $Ri_{SUB}$ (e.g. R1 to R4, R6, R8 and R14 to R17) of block search regions from the multiple block search regions Ri, wherein one or more block search regions (e.g. R1, R2) contained in said predefined subset $Ri_{SUB}$ (e.g. R1 to R4, R6, R8 and R14 to R17) are located, at least partially, in previously coded portions of the current coding-block 150. Advantageously, each one of the block search regions Ri contained in the subset $Ri_{SUB}$ may be located, at least partially, in previously coded portions of the current coding-block 150. The previously coded portions may also be referred to as previously coded areas, i.e. areas inside the picture or areas inside the coding-block 150 (CTU), which areas have already been coded before. In other words, region subsets $Ri_{SUB}$ may be specified, which may partially lie in the current coding block 150, depending on the current coding position and including only previously coded areas.

Additionally or alternatively, embodiments may provide an encoder 10 wherein, for a current block 110 to be currently coded, the encoder 10 is configured to select a predefined subset $Ri_{SUB}$ of block search regions from the multiple block search regions Ri, wherein one or more block search regions contained in said predefined subset $Ri_{SUB}$ may be located at least partially in previously coded portions of the current coding-block 150 and at least partially in previously coded portions of a previously coded coding-block 150'. Advantageously, each one of the block search regions Ri contained in the subset $Ri_{SUB}$ may be located, at least partially, in previously coded portions of the current coding-block 150 and at least partially in previously coded portions of a previously coded coding-block 150'. The previously coded portions may also be referred to as previously coded areas, i.e. areas inside the picture or areas inside the coding-block 150 (CTU) and/or the previously coded coding-block (CTU) 150', respectively, which areas have already been coded before. In other words, region subsets $Ri_{SUB}$ may be specified, which may partially lie in the current coding block 150 and/or in a collocated coding block 150', depending on the current coding position and including only previously coded areas.

Again, the encoder 10 may be configured to select the predefined subset $Ri_{SUB}$ of block search regions depending on the position of the current block 110 inside the current CTU (coding-block) 150 to be currently coded. Different positions of the current block 110 will now be discussed in more detail with reference to FIGS. 8A to 8D, in which the encoder 10 may be configured to split a current CTU 150 into four CUs 151, 152, 153, 154.

As shown in FIG. 8A, the current block 110 may be located in the first CU (coding-subblock) 151 of the current CTU (coding-block) 150. In this case, the encoder 10 may be configured to select the predefined subset $Ri_{SUB}$ of block search regions such that the block search regions contained in said predefined subset $Ri_{SUB}$ are located at least partially in the first CU (coding-subblock) 151 of the current CTU (coding block) 150 and at least partially in one or more co-located CUs (coding-subblocks) 152', 154' of a previously coded CTU (coding-block) 150'.

Figure 8B:
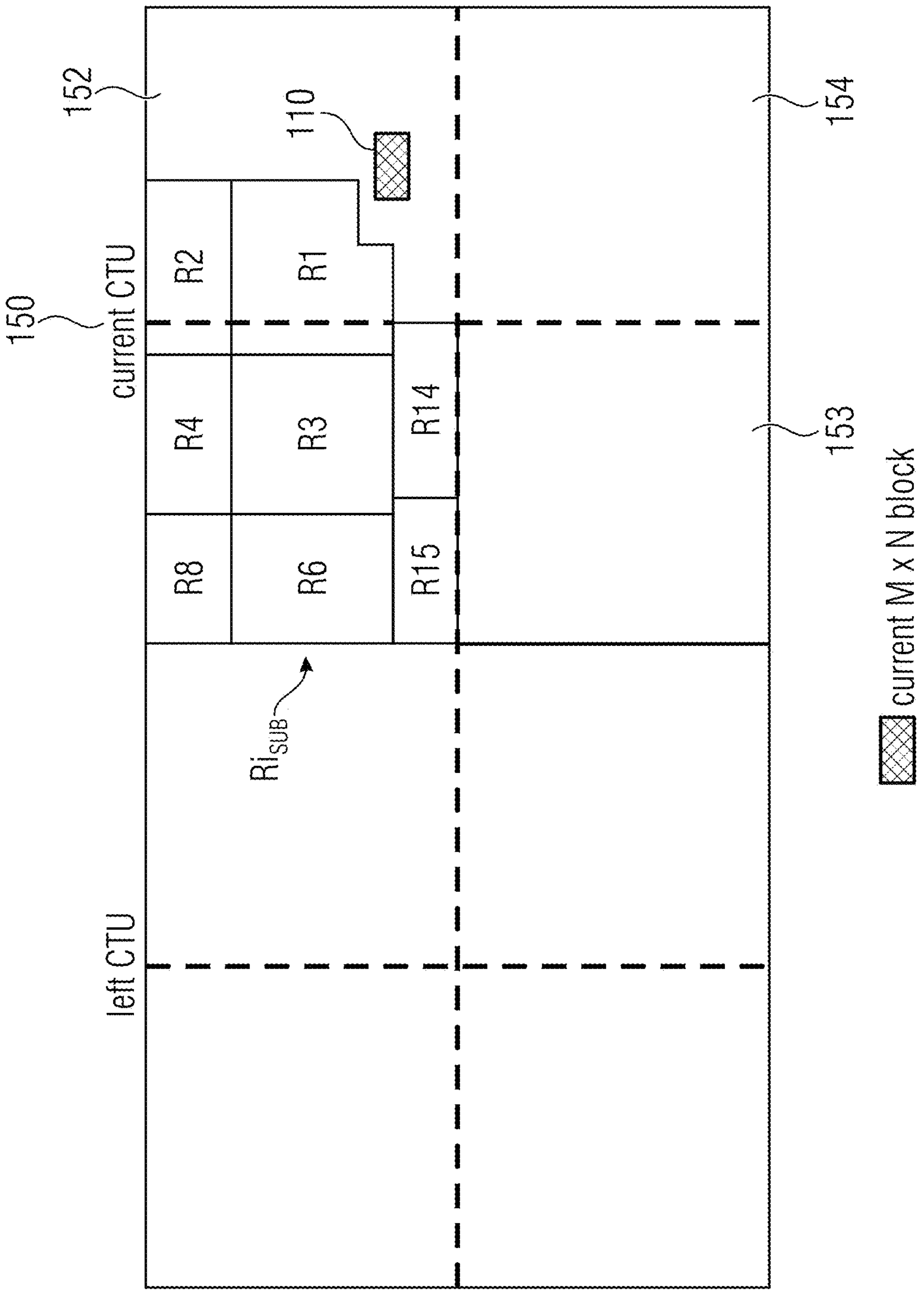
FIG. 8B shows a schematic diagram of available block search regions in a predefined subset of block search regions according to an embodiment, wherein the current block is located in the second quadrant of the current CTU.

As shown in FIG. 8B, the current block 110 may be located in the second CU (coding-subblock) 152 of the current CTU (coding-block) 150. In this case, the encoder 10 may be configured to select the predefined subset $Ri_{SUB}$ of block search regions such that the block search regions contained in said predefined subset $Ri_{SUB}$ are located at least partially in the second CU (coding-subblock) 152 of the current CTU (coding-block) 150 and at least partially in the first CU (coding-subblock) 151 of the current CTU (coding-block) 150.

Figure 8C:
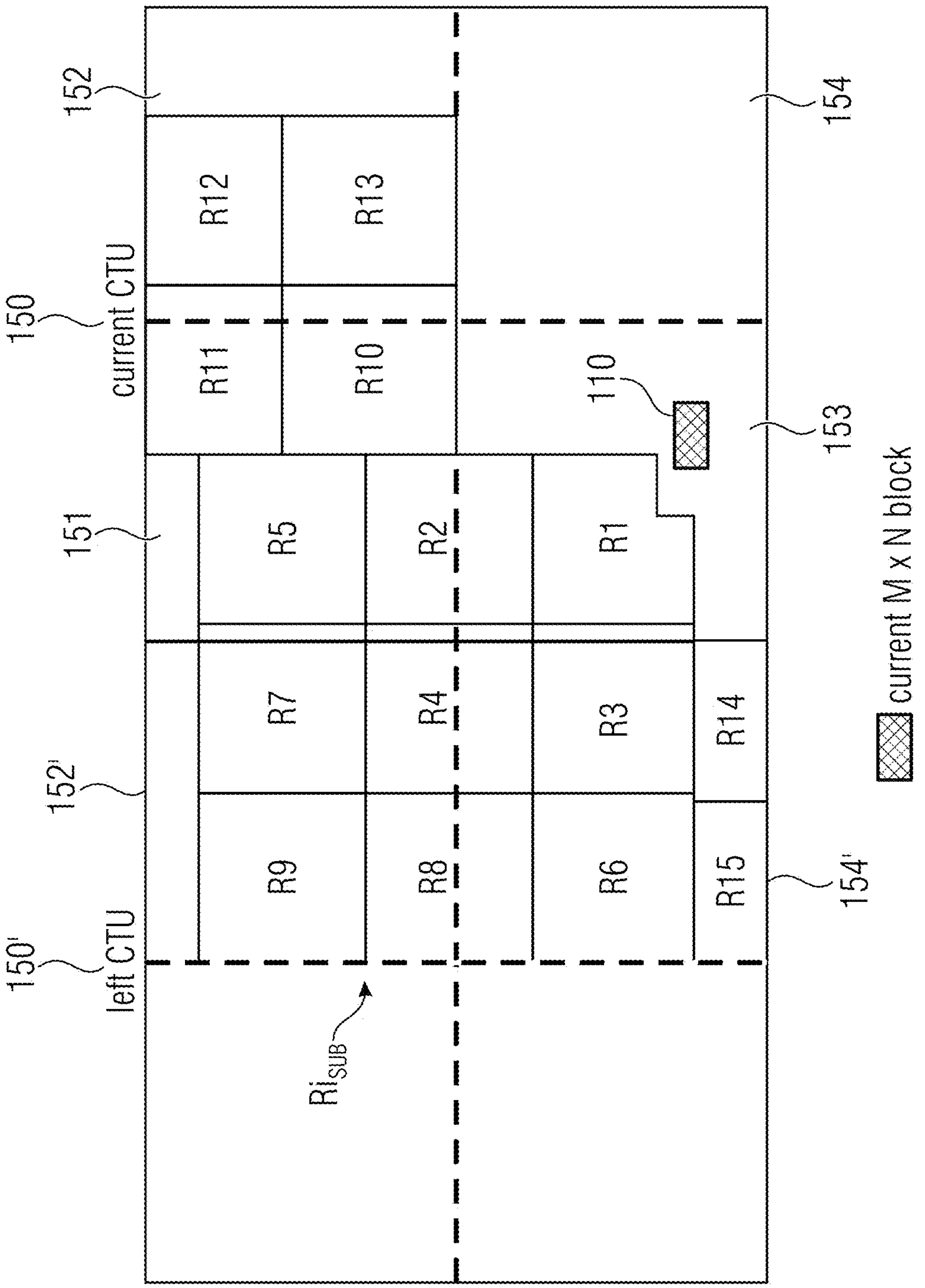
FIG. 8C shows a schematic diagram of available block search regions in a predefined subset of block search regions according to an embodiment, wherein the current block is located in the third quadrant of the current CTU.

As shown in FIG. 8C, the current block 110 may be located in the third CU (coding-subblock) 153 of the current CTU (coding-block) 150. In this case, the encoder 10 may be configured to select the predefined subset $Ri_{SUB}$ of block search regions such that the block search regions contained in said predefined subset $Ri_{SUB}$ are located at least partially in the third CU (coding-subblock) 153 of the current CTU (coding-block) 150 and at least partially in the first CU (coding-subblock) 151 of the current CTU (coding-block) 150 and at least partially in the second CU (coding-subblock) 152 of the current CTU (coding-block) 150 and at least partially in one or more co-located CUs (coding-subblocks) 152', 154' of a previously coded CTU (coding-block) 150'.

Figure 8D:
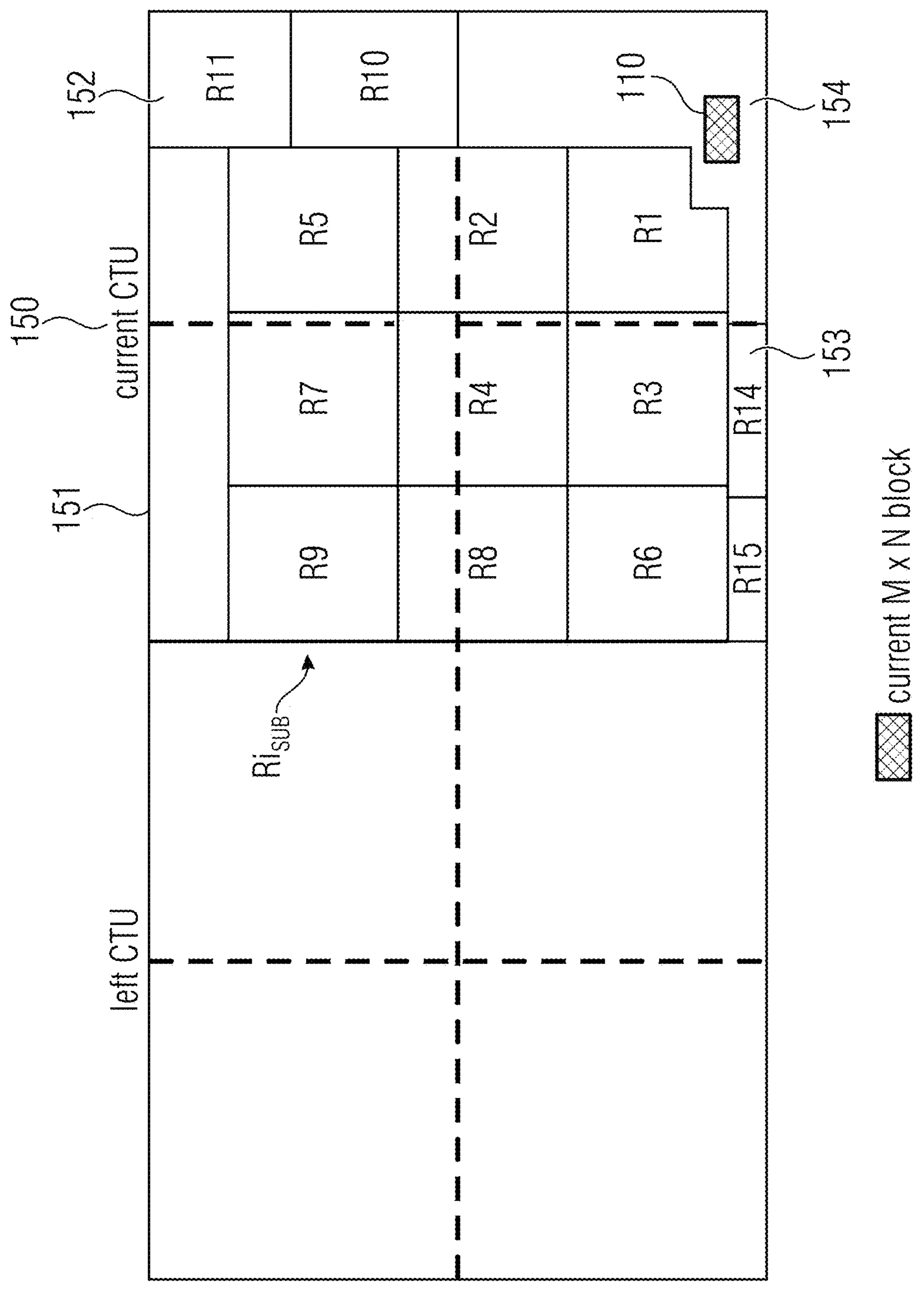
FIG. 8D shows a schematic diagram of available block search regions in a predefined subset of block search regions according to an embodiment, wherein the current block is located in the fourth quadrant of the current CTU.

As shown in FIG. 8D, the current block 110 may be located in the fourth CU (coding-subblock) 154 of the current CTU (coding-block) 150. In this case, the encoder 10 may be configured to select the predefined subset $Ri_{SUB}$ of block search regions such that the block search regions contained in said predefined subset $Ri_{SUB}$ are located at least partially in the fourth CU (coding-subblock) 154 of the current CTU (coding-block) 150 and at least partially in the first CU (coding-subblock) 151 of the current CTU (coding-block) 150 and at least partially in the second CU (coding-subblock) 152 of the current CTU (coding-block) 150 and at least partially in the third CU (coding-subblock) 153 of the current CTU (coding-block) 150.

As can be seen, for example, in FIGS. 8C and 8D the above described (see FIG. 7) borders in x-direction and/or in y-direction may be shifted along the respective x-axis or y-axis in order to cover a large number of previously coded samples with the block search regions. For example, at least the regions R10 and R11 are shifted along the y-axis so as to cover the samples contained in the top lines of the first and second CUs 151, 152.

Summarizing in more general terms, the encoder 10 may select, for applying the BM search, a predefined subset $Ri_{SUB}$ of block search regions, wherein the regions contained in the respective subset $Ri_{SUB}$ depend on the position of the current block 110 inside the current CTU (coding-block) 150. The available regions Ri may be saved into a region list regList. In other words, after identifying the current position of the current block 110 to be predicted, a block search region list called regList may be generated. Let a be the number of block search regions, e.g. R1 to R17, in this list. This list can be obtained anywhere in the encoder and decoder, and it will be same at both sides. Accordingly, this list regList may define the subset $Ri_{SUB}$ of block search regions.

The BM (block match) search may be conducted in those block search regions Ri which are listed in the region list regList, i.e. in those regions Ri being contained in the subset $Ri_{SUB}$. The BM search is for searching a suitably matching second predetermined block 112, which may in case of predictive coding, be a prediction block. A suitably matching second predetermined block 112 may, for instance, be found by exploiting an error minimizing metric, e.g. a sum of absolute differences (SAD).

During the BM search, integer sample positions inside the block search regions Ri, or inside the above discussed subset $Ri_{SUB}$ of block search regions, may be checked for finding the best match for the current original block 110 by, e.g. calculating the SAD between the two blocks 110, 112. The block 112 that gives the least SAD error may be considered as the best match for the original block 110 and it may be assigned as the suitably matching second predetermined block 112.

The region Ri in which the suitably matching second predetermined block 112 was found may be identified by the encoder 10, and the encoder 10 may encode a related region index i, being associated with the respective region Ri into the data stream 14. Thus, the region index i may be transmitted to the decoder 20 which only has to decode said region index i, which indicates towards the decoder 20 that one block search region Ri in which the second predetermined block 112 is located.

Additionally or alternatively, the encoder 10 may also encode the difference $\Delta_{111,\ 112}$ between the first and second predetermined blocks 111, 112 into the data stream 14. Each region Ri may have its own first predetermined block 111, which may be, in case of predictive coding, a predictor block. The first predetermined block 111 of each region Ri may be known to both the encoder 10 and the decoder 20. In some examples, as previously discussed with reference to FIG. 5, the first predetermined block 111 may be a center block defining a center of its block search region Ri. However, irrespective of the concrete position of the first predetermined block 111 inside its region Ri, the difference $\Delta_{111,\ 112}$ between the first and second predetermined blocks 111, 112 may be determined by the encoder 10. That difference $\Delta_{111,\ 112}$ may be signaled, for example, by means of a so-called differential block vector ribc_bvd (c.f. FIG. 5).

In summary, the encoder 10 identifies at least one region Ri in which a suitably matching second predetermined block 112 was found. The encoder 10 may calculate a difference $\Delta_{111,\ 112}$ between said found second predetermined block 112 of said region Ri and the first predetermined block 111 belonging to said region Ri. The encoder 10 may encode at least one of the index i of said region Ri and the difference $\Delta_{111,\ 112}$ into the data stream 14.

Figure 9:
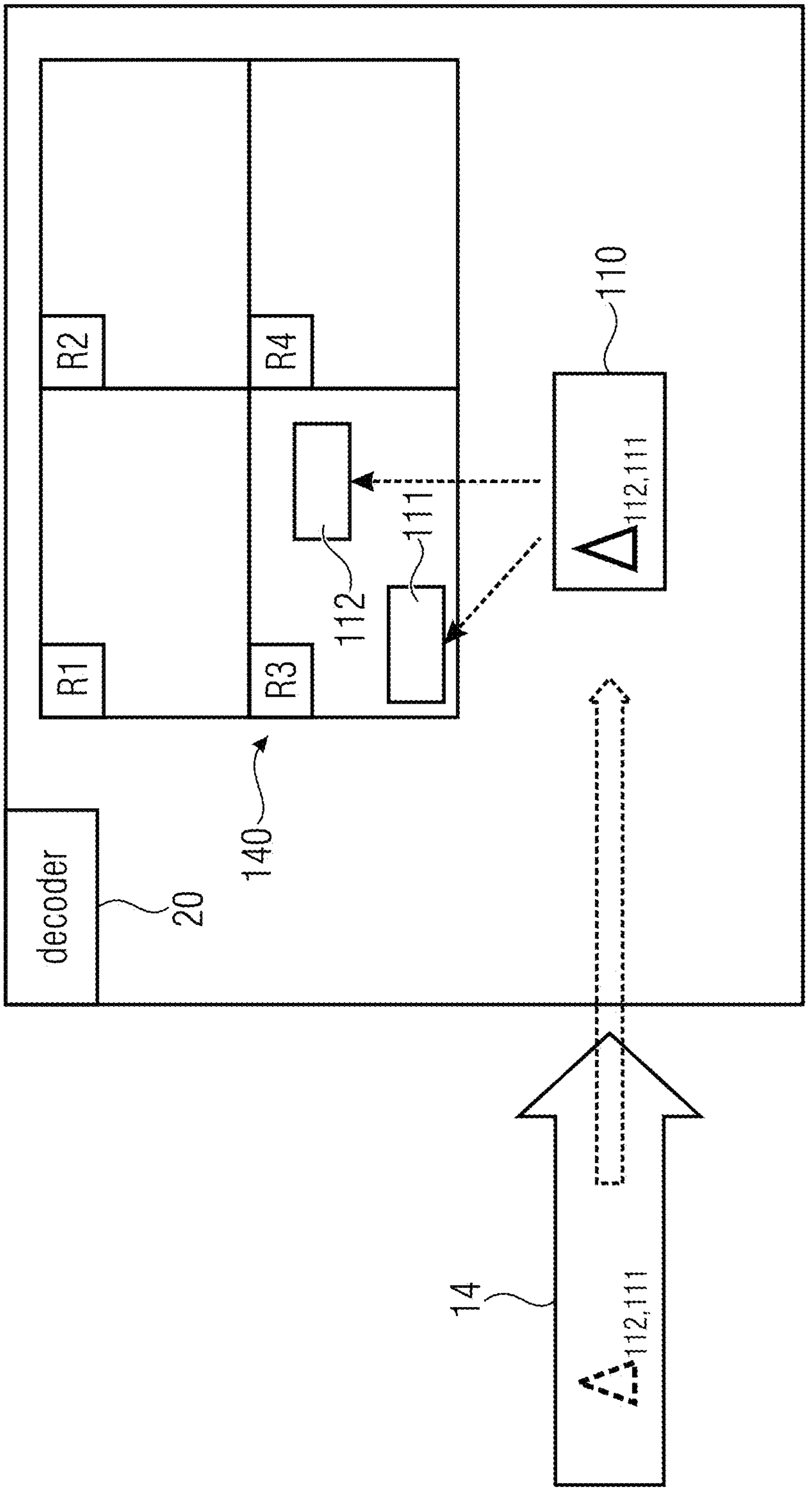
FIG. 9 shows a schematic block diagram of a block-based decoder according to an embodiment.

FIG. 9 shows a corresponding decoder 20 for block-based decoding a picture from a data stream 14, wherein the decoder 20 is configured to reconstruct a current block 110 of the picture based on a difference $\Delta_{111,\ 112}$ between a first predetermined block 111 and a second predetermined block 112 inside a block search area Ri (example here: R3), wherein the decoder 20 is configured to derive said difference $\Delta_{111,\ 112}$ from the data stream 14, and wherein the decoder 20 is further configured to partition the block search area 140 into multiple block search regions Ri (example here: R1 to R4).

As can be seen, the decoder 20 may derive at least the difference $\Delta_{111,\ 112}$, e.g. a differential value such as a differential block vector, from the data stream 14. The decoder 20 may apply this difference $\Delta_{111,\ 112}$ to at least one of the block search regions R1 to R4. Therefore, the decoder 20 may retrieve the region index i of the respective region Ri (here: index 3 for region R3) from a list, or the decoder 20 may optionally derive the region index i of the respective region Ri from the data stream 14 since the region index i may, at least according to some embodiments, be optionally transmitted in the data stream 14.

The decoder 20 may be aware of the position of the first predetermined block 111 inside the respective block search region Ri (here: inside R3). In knowledge of the difference $\Delta_{111,\ 112}$ the decoder 20 can determine the position of the second predetermined block 112 inside the respective region Ri (here: inside R3). Based thereon, the decoder 20 may decode the current block 110 that is to be currently decoded. For example, in case of predictive coding, the second predetermined block 112 may be a prediction block from which the current block 110 may be predicted.

Everything that has been described above with respect to the encoder 10 also holds true for the decoder 20.

For instance, the decoder 20 may be configured to identify, based on the above mentioned derived region-index i, that one block search region Ri in which the second predetermined block 112 is located, and the decoder 20 may be aware of the position of the first predetermined block 111 inside said identified one block search region Ri.

The first predetermined block 111 may be positioned at an integer position inside said identified one block search region Ri, said integer position being known to the decoder 20. For example, said integer position may be a center of said identified one block search region Ri. That is, the first predetermined block 111 may be a center block, as exemplarily described above with reference to FIG. 5.

The decoder 20 may be configured to decode the current block 110 based on the difference $\Delta_{111, 112}$ derived from the data stream 14 and based on the region-index i derived from the data stream 14. For example, the decoder 20 may derive from the data stream 14 the region index i indicating towards the decoder 20 in which block search region Ri (example here: R3) the suitably matching second predetermined block 112 (e.g. a prediction block in case of predictive coding) can be found. Furthermore, the decoder 20 may derive from the data stream 14 the difference $\Delta_{111, 112}$ representing a differential value between the first predetermined block 111 (e.g. a predictor block in case of predictive coding) inside the indicated region Ri and the second predetermined block 112 inside the indicated region Ri. Based on the transmitted region index land the transmitted difference $\Delta_{111, 112}$ the decoder 20 may be enabled to calculate the position of the second predetermined block 112 inside the derived block search region Ri (example here: R3). For example, the difference $\Delta_{111, 112}$ may be a spatial difference between the first and second predetermined blocks 111, 112 inside the block search region Ri. The spatial difference may be signaled by means of block vectors, as exemplarily described above with reference to FIG. 5.

Accordingly, the decoder 20 may be configured to use predictive coding, wherein the first predetermined block 111 is a predictor block, the second predetermined block 112 is a prediction block, and the current block 110 is a block to be predictively decoded based on at least one of the predictor block 111 and the prediction block 112. Additionally or alternatively, decoder 20 may be configured to apply a block-vector-based signaling using a first block vector bvp (c.f. FIG. 5) and a second block vector bv, the first block vector bvp indicating a relative spatial distance between the current block 110 and the first predetermined block 111, and the second block vector by indicating a relative spatial distance between the current block 110 and the second predetermined block 112.

The first block vector bvp may be known to the decoder 20, and the decoder 20 may be configured to derive from the data stream 14 a differential vector ribc_bvd (c.f. FIG. 5) representing the difference $\Delta_{111, 112}$ between the first block vector bvp and the second block vector bv, and thus the difference between the first and second predetermined blocks 111, 112, respectively. The decoder 20 may be further configured to calculate the second block vector by based on said differential vector ribc_bvd and the first block vector bvp to obtain, in result, the relative spatial distance between the current block 110 and the second predetermined block 112 in order to predictively decode the current block 110, e.g. according to the following equation:

$$bv=ribc\_bvd+bvp$$

Based on the calculated vector bv, the decoder 20 may decode the picture content using the innovative principle of RIBC. The decoder 20 may decode each block search region Ri in the above described manner, wherein each block search region Ri may comprise its own first predetermined block 111 and/or its own associated block vector bvp.

Furthermore, at least one of the size of the current block 110, the one or more block search regions Ri and the block search area 140 may be variable. Still further, the number of block search regions Ri into which the block search area 140 may be partitioned may be variable. Still further, the number of block search regions Ri contained in an above described subset $Ri_{SUB}$ may be variable.

The invention also concerns respective methods for block based encoding and for block based decoding a picture exploiting to the innovative principle of RIBC.

Figure 10A:
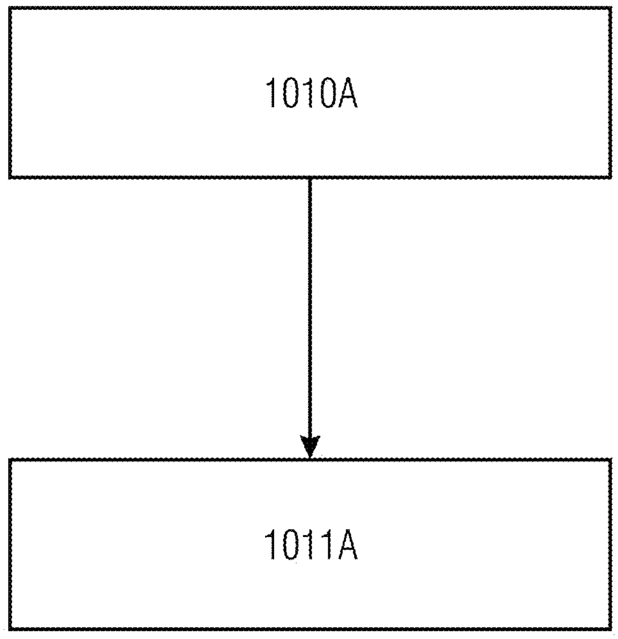
FIG. 10A shows a schematic block diagram of a method for block-based encoding according to an embodiment.

FIG. 10A shows a block diagram of a method for block-based encoding a picture 12 into a data stream 14. In Block 1010A a current block 110 of the picture 12 may be encoded based on a difference $\Delta_{111, 112}$ between a first predetermined block 111 and a second predetermined block 112 inside a block search area 140. In block 1011A said difference $\Delta_{111, 112}$ is encoded into the data stream 14. According to the innovative principle of RIBC, the block search area 140 is partitioned into multiple block search regions Ri, as explained in detail above.

Figure 10B:
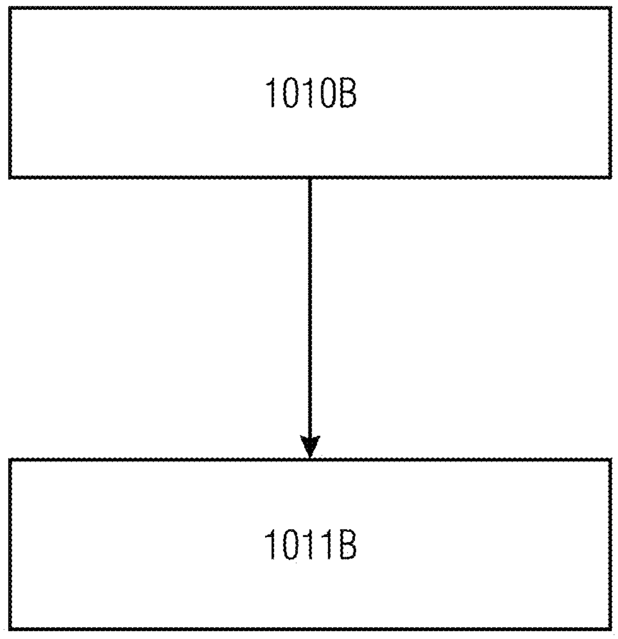
FIG. 10B shows a schematic block diagram of a method for block-based decoding according to an embodiment.

FIG. 10B shows a block diagram of a method for block-based decoding a picture 12 from a data stream 14. In Block 1010B a current block 110 of the picture 12 is reconstructed based on a difference $\Delta_{111, 112}$ between a first predetermined block 111 and a second predetermined block 112 inside a block search area 140. In block 1011B said difference $\Delta_{111, 112}$ is derived from the data stream 14. According to the innovative principle of RIBC, the block search area 140 is partitioned into multiple block search regions Ri, as explained in detail above.

In the following, the innovative principle of the present invention shall be briefly summarized in some other words:

As exemplarily shown in FIG. 7, the herein described principle of region-based intra block copy (RIBC) may partition the block search area 140 into many block search regions Ri, for example R1 to R17. Generally spoken, the block search area 140 may be partitioned into at least one block search region Ri. In this case, the at least one block search region Ri may comprise the same size as the entire block search area 140. For example, the RIBC may partition the block search area 140 into at least two block search regions R1, R2. In this case, each of the at least two block search regions R1, R2 may have a size being smaller than the entire block search area 140.

At least one of the block search regions Ri (e.g. R1 to R17) may comprise a block 112 which gives the least SAD error (i.e. the second predetermined block 112, also referred to as prediction block). Thus, this at least one region Ri may be considered as the best region. A region index i for indicating said at least one region Ri may be transmitted to the decoder, for example instead of a commonly used bvp_flag.

For example, the region-based intra block copy RIBC may partition the search area 140 into n square regions of size k (in the non-limiting example detailed in this document n=17 and k=35). The regions R1 to R17 are clearly defined so that the encoder 10 and decoder 20 can be perfectly synchronized, and thus both encoder 10 and decoder 20 chooses the same prediction block (i.e. second predetermined block) 112.

As exemplarily shown in FIG. 5, which will be discussed in more detail below, the first predetermined block (for example, the block at the centre of the region i) 111 in the signalled region i may be the predictor of the current block 110. Thus, the difference between the predictor block (i.e. the first predetermined block in the region i) 111 and the prediction block (i.e. the second predetermined block in the region i) 112 may be the displacement vector of RIBC ribc_bvd.

The herein described non-limiting examples of the proposed method may be implemented, for instance, on Versatile Video Coding (VVC) reference software (VTM), where the CTUs are coded from left to right.

Figure 6:
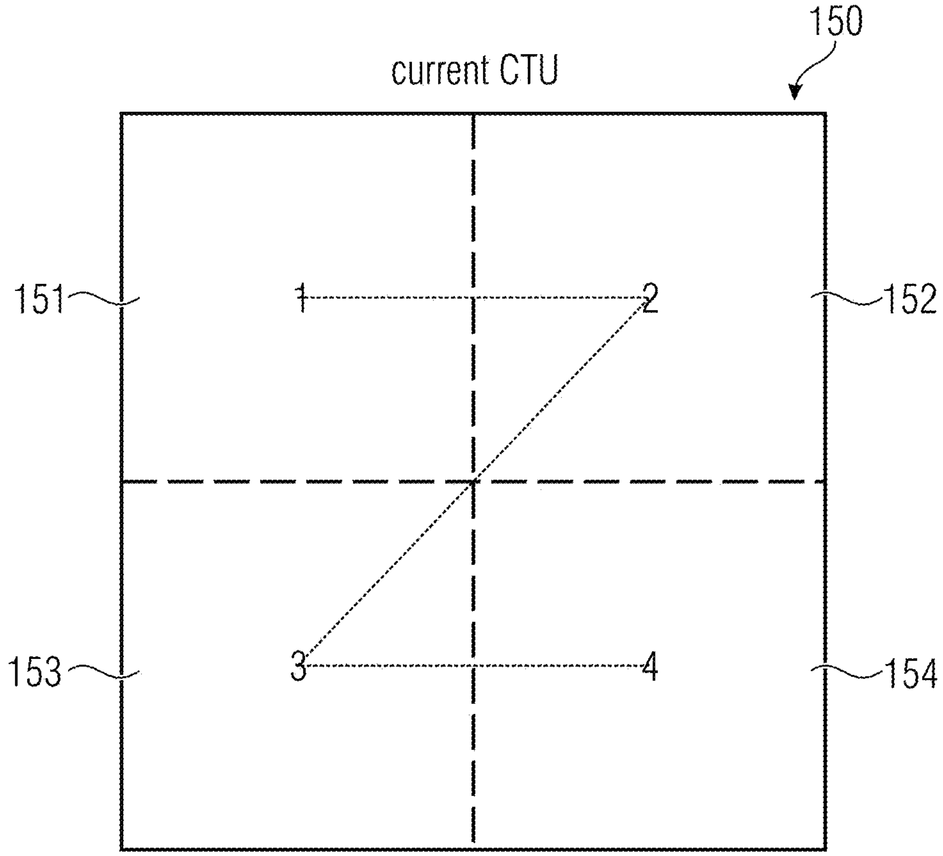
FIG. 6 shows a schematic block diagram of a CTU being divided in four CUs and being coded in a z-scan order.

FIG. 6 shows an example of a CTU (Coding Tree Unit) 150. After a first split (which may be a quad split) on the CTU 150, four equally sized CUs 151, 152, 153, 154 may be formed.

However, splitting may not be restricted to regular quad-splits resulting in only square or equally sized CUs, as shown in FIG. 6. Also differently shaped CUs may be provided, for example rectangular CUs resulting from two consecutive binary splits for instance.

The resulting four CUs 151, 152, 153, 154 may be coded one by one in a Z-scan order. Therefore, the search area available for the BM search may depend on the position of the current block 110.

For example, the second CU 152 cannot search in the third CU 153 (also not in the fourth CU 154) because CUs 153, 154 may not have been previously coded. However, the third CU 153 can search in the second CU 152 (also in the first CU 152) because they may have been previously coded already. Thus, the number of regions that may be available to a current block 110 may depend on its position inside the current CTU 150.

For example, if the current block 110 is in the first position of the first CTU 150 in the picture, then no regions may be available as there is no area for the BM searching. Further, the borders of a region R1 to R17 may also depend on the position of the current block 110. However, the maximum region size may remain the same (in the non-limiting example here, k=35). More detailed examples may now be discussed with reference to FIGS. 8A to 8D.

As shown in the non-limiting example of FIG. 8A, the encoder 10 and/or the decoder 20 may be configured to split a current CTU 150 into at least a first CU 151, a second CU 152, a third CU 153 and a fourth CU 154. If the current block 110 is located in the first CU 151, the encoder 10 and/or decoder 20 may be configured to select a predefined subset $Ri_{SUB}$ of block search regions (in this case R1-R4, R6, R8, R14-R17) such that the block search regions contained in said predefined subset $Ri_{SUB}$ are located at least partially in the first CU 151, and at least partially in one or more co-located CUs 152', 154' of a previously coded CTU 150'.

As shown in the non-limiting example of FIG. 8B, the encoder 10 and/or the decoder 20 may be configured to split a current CTU 150 into at least a first CU 151, a second CU 152, a third CU 153 and a fourth CU 154. If the current block 110 is located in the second CU 152, the encoder 10 and/or decoder 20 may be configured to select a predefined subset $Ri_{SUB}$ of block search regions (in this case R1-R4, R6, R8, R14, R15) such that the block search regions contained in said predefined subset $Ri_{SUB}$ are located at least partially in the second CU 152, and at least partially in the first CU 151.

As shown in the non-limiting example of FIG. 8C, the encoder 10 and/or the decoder 20 may be configured to split a current CTU 150 into at least a first CU 151, a second CU 152, a third CU 153 and a fourth CU 154. If the current block 110 is located in the third CU 153, the encoder 10 and/or decoder 20 may be configured to select a predefined subset $Ri_{SUB}$ of block search regions (in this case R1 to R15) such that the block search regions contained in said predefined subset $Ri_{SUB}$ are located at least partially in the third CU 153, and at least partially in the first CU 151, and at least partially in the second CU 152, and at least partially in one or more co-located CUs 152', 154' of a previously coded CTU 150'.

As shown in the non-limiting example of FIG. 8D, the encoder 10 and/or the decoder 20 may be configured to split a current CTU 150 into at least a first CU 151, a second CU 152, a third CU 153 and a fourth CU 154. If the current block 110 is located in the fourth CU 154, the encoder and/or decoder may be configured to select a predefined subset $Ri_{SUB}$ of block search regions (in this case R1 to R11, R14, R15) such that the block search regions contained in said predefined subset $Ri_{SUB}$ are located at least partially in the fourth CU 154, and at least partially in the first CU 151, and at least partially in the second CU 152, and at least partially in the third CU 153.

After identifying the current position of the current block 110 to be predicted, a block search region list called regList may be generated. Let a be the number of block search regions Ri, e.g. R1 to R17, in this list. This list can be obtained anywhere in the encoder 10 and decoder 20, and it will be same at both sides.

At the encoder 10, a best match for the original block (current block) 110 may be found using an error minimizing metric (for example, SAD). The proposed method may calculate the SAD error of the original block 110 against every block in the integer sample locations of each region Ri, e.g. R1 to R17, one by one from regList[0] to regList[α−1]. The block that gives the least SAD error may be selected as the second predetermined block 112, e.g. as the prediction block.

The index of the region i, where 0≤i≤(α−1), that has the prediction block 112 may be saved into the prediction unit (PU). The difference between the first predetermined block (i.e. predictor block) 111, for example a centre block of the chosen region Ri (e.g. FIG. 5: the predictor block 111 of RIBC in the given example with block vector bvp) and the prediction block 112 may be saved as mvd (i.e. ribc_bvd) into the PU. In case the predictor block 111 is a centre block inside a block search region Ri, then the associated block vector may be $centre_i$, which may be known to both the encoder 10 and the decoder 20. The region index i and ribc_bvd may be transmitted to the decoder 20 inside the data stream 14.

The encoder 10 may calculate the RD (Rate Distortion) cost of RIBC using its in-built rate-distortion optimisation algorithm and may compare it against other intra methods. If RIBC gives the least RD cost, then i and ribc_bvd may be sent to the decoder 20.

At the decoder 20, if the current mode is MODE_IBC, the decoder 20 may parse the region index i from the data stream 14 and may identify the region Ri (thus the predictor block 111 also). The ribc_bvd may also be read and finally, $$bv = \text{ribc\_bvd} + centre_i \quad [2]$$

The BM search at the encoder 10 may be carried out at integer sample positions and the ribc_bvd signalling may also be at integer sample level.

It should be noted that the predictor block 111 of RIBC can be any predetermined integer sample location inside the region i. In the non-limiting example detailed here, it may be considered as the centre of the region i.

Region List Generation

As described before, a region list regList may be maintained at the encoder 10 and decoder 20. The region list regList may be generated based on the position of the current block 110 and hence for a particular block it will be same both at the encoder 10 and at decoder 20.

The region list regList may be generated in the following order:

Check left bottom PU (w.r.t current PU). If it exists and it is IBC (not IBC merge), add its region index into regList.

Check top right PU (w.r.t current PU). If it exists and it is IBC (not IBC merge), and not same as the previous entry in regList, add its region index into regList.

The rest of the regions Ri may be added in a predefined order. The order may change according to the quadrant of the current block 110 in the current CTU 150.

Before adding to regList, it is checked if it is not same as any previous entry into regList. It is also checked if the region exists in the reconstructed picture. If at least one sample exists in the region, then it is considered as a valid region.

Region Index Signaling

The signaling of the region index i may be based on the number of regions a available in the regList. For effective signaling, the coding may be done in such a way that with smaller value of a, fewer bins may be used for transmitting i. Any type of entropy coding scheme can be used for transmitting the region index i. For further effectiveness of the coding scheme, context modelling can be applied for relevant bins. For example, the first two region indices can be considered as the most probable regions and context models can be applied to signal their bins. Then the rest of the regions can be transmitted using fixed-length coding or unary coding.

The number of bins used for signaling i may depend on $\alpha$. For example, if $\alpha=8$, only three bins may be needed. However, if $\alpha=4$, only two bins (instead of three) may be sufficient. Thus, a variable number of bins may be used for coding the region index i based on the value of $\alpha$. Since the value of $\alpha$ may vary to a certain extent depending on the position of the current block 110, a variable signaling approach may be more effective.

Bvd Signaling

RIBC may use different bvd signaling from normal IBC (normal IBC uses the same syntax for bvd signaling as in an inter mvd signalling). RIBC may not use exp-Golomb coding for bvd signaling, instead fixed-length coding may be used. Since the maximum range of the ribc_bvd is clearly known ($-17 \leq$ ribc_bvd (x,y)$\leq 17$, in the given example), fixed-length coding is more effective than exp-Golomb coding.

Optimizations

The following optimizations are proposed for achieving a better trade-off between coding gain and encoder complexity.

If the most_probable_mode[0]=DC_IDX, then only region 1 may be available to the current block 110. Other regions are not tested at the encoder. The region index i may not be sent in this case.

Restrict applying fewer regions to large blocks, for example: applying all regions for 4×4 blocks and only Region 1 for other blocks. The signaling may also be modified accordingly.

Encoder-Speedups

The following speed-up can be applied for encoder complexity reduction with slight loss in the coding gain.

Test RIBC after testing normal intra methods. Before RIBC test starts, check if the transform skip tool is enabled in the best CU so far. If yes, skip RIBC testing for the current block. Otherwise continue RIBC testing.

Briefly summarizing, in order to achieve a better trade-off between coding gain and encoder complexity, a region-based approach for intra block copy is described herein. The region-based intra block copy (RIBC) partitions the search area 140 into many regions Ri. The region i that has the block 112 that gives the least SAD error is considered as the best region. The region index i may be transmitted to the decoder 20 in the place of the bvp_flag. A predefined block 111 (in the given example, it is the block at the centre of the region) in the signalled region i may be a predictor of the current block 110. Thus, the difference between the predictor block 111 (i.e. the predefined block in the region i) and prediction block 112 is the displacement vector of RIBC ribc_bvd.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] X. Xu, S. Liu, T. D. Chuang, Y. W. Huang, S. M. Lei, K. Rapaka, C. Pang, V. Seregin, Y. K. Wang, and M. Karczewicz, "Intra Block Copy in HEVC Screen Content Coding Extensions", IEEE JOURNAL ON EMERGING AND SELECTED TOPICS IN CIRCUITS AND SYSTEMS, VOL. 6, NO. 4, DECEMBER 2016

[2] G. Sullivan and J. R. Ohm, "Meeting Report of the 12$^{th}$ meeting of the Joint Video Experts Team (JVET), Macao, CN, 3-12 Oct. 2018", Macao, CN, 3-12 Oct. 2018

[3] W. J. Chien, V. Seregin, M. Karczewicz, "CE8-related: CPR mode signaling and interaction with inter coding tools", Marrakech, MA, 9-18 Jan. 2019

[4] X. Xu, X. Li, S. Liu, E. Chai, "CE8: CPR reference memory reuse without increasing memory requirement (CE8.1.2a and CE8.1.2d)", Marrakech, MA, 9-18 Jan. 2019

The invention claimed is:

1. A decoder for block-based decoding a picture from a data stream, wherein the decoder is configured to reconstruct a current block of the picture based on a difference between a first predetermined block and a second predetermined block inside a block search area, wherein the decoder is configured to derive said difference from the data stream, wherein the decoder is further configured to partition the block search area into multiple block search regions, wherein the decoder is configured to apply a block-vector-based signaling using a first block vector and a second block vector, the first block vector indicating a relative spatial distance between the current block and the first predetermined block, and the second block vector indicating a relative spatial distance between the current block and the second predetermined block; and wherein the first block vector is known to the decoder and wherein the decoder is configured to derive from the data stream a differential vector representing the difference between the first block vector and the second block vector, and wherein the decoder is further configured to calculate the second block vector based on said differential vector and the first block vector to acquire, in result, the relative spatial distance between the current block and the second predetermined block in order to predictively decode the current block.

2. The decoder of claim 1, wherein the first predetermined block and the second predetermined block are both located inside one and the same block search region.

3. The decoder of claim 1, wherein the multiple block search regions define regions in which the decoder is to find the second predetermined block, wherein the decoder is configured to derive from the data stream a region-index indicating that one block search region in which the second predetermined block is located.

4. The decoder of claim 3, wherein the decoder is configured to identify, based on the derived region-index, that one block search region in which the second predetermined block is located, and wherein the decoder is aware of the position of the first predetermined block inside said identified one block search region.

5. The decoder of claim 4, wherein the first predetermined block is positioned at an integer position inside said identified one block search region, said integer position being known to the decoder; and wherein said integer position is a center of said identified one block search region.

6. The decoder of claim 1, wherein the decoder is configured to use predictive coding, wherein the first predetermined block is a predictor block, the second predetermined block is a prediction block, and the current block is a block to be predictively decoded based on at least one of the predictor block and the prediction block.

7. The decoder of claim 1,
wherein the difference between the first predetermined block and the second predetermined block corresponds to a relative spatial distance between the first predetermined block and the second predetermined block inside one and the same block search region.

8. The decoder of claim 1,
wherein the decoder is configured to partition the block search area into a number of n block search regions of a predetermined size K×L; and/or
wherein the decoder is configured to partition the block search area into multiple block search regions of the same size.

9. The decoder of claim 1,
wherein the decoder is configured to partition the block search area into multiple block search regions of different sizes; and/or
wherein the decoder is configured to partition the block search area into multiple square-shaped block search regions; and/or
wherein the decoder is configured to partition the block search area into multiple adjoining block search regions.

10. The decoder of claim 2,
wherein, for a current coding-block to be currently coded, the decoder is configured to select a predefined subset of block search regions from the multiple block search regions, wherein one or more block search regions comprised by said predefined subset are located, at least partially, in previously coded portions of the current coding-block; and/or
wherein, for a current block to be currently coded, the decoder is configured to select a predefined subset of block search regions from the multiple block search regions, wherein one or more block search regions comprised by said predefined subset are located
at least partially in previously coded portions of the current coding-block and
at least partially in a previously coded coding-block.

11. The decoder of claim 10,
wherein the decoder is configured to select the predefined subset of block search regions depending on the position of the current block inside the current coding-block to be currently coded; and/or
wherein the decoder is configured to define borders of one or more of the multiple block search regions depending on the position of the current block inside the current coding-block to be currently coded.

12. The decoder of claim 10,
wherein the decoder is configured to split a current coding-block into at least a first coding-subblock, a second coding-subblock, a third coding-subblock and a fourth coding-subblock, and
if the current block is located in the first coding-subblock,
the decoder is configured to select the predefined subset of block search regions such that the block search regions comprised by said predefined subset are located
at least partially in the first coding-subblock and
at least partially in one or more co-located coding-subblocks of a previously coded coding-block; or
wherein the decoder is configured to split a current coding-block into at least a first coding-subblock, a second coding-subblock, a third coding-subblock and a fourth coding-subblock, and
if the current block is located in the second coding-subblock,
the decoder is configured to select the predefined subset of block search regions such that the block search regions comprised by said predefined subset are located
at least partially in the second coding-subblock of the current coding-block and
at least partially in the first coding-subblock of the current coding-block.

13. The decoder of claim 10,
wherein the decoder is configured to split a current coding-block into at least a first coding-subblock, a second coding-subblock, a third coding-subblock and a fourth coding-subblock, and
if the current block is located in the third coding-subblock,
the decoder is configured to select the predefined subset of block search regions such that the block search regions comprised by said predefined subset are located
at least partially in the third coding-subblock of the current coding-block and
at least partially in the first coding-subblock of the current coding-block and
at least partially in the second coding-subblock of the current coding-block and
at least partially in one or more co-located coding-subblocks of a previously coded coding-block; or
wherein the decoder is configured to split a current coding-block into at least a first coding-subblock, a second coding-subblock, a third coding-subblock and a fourth coding-subblock, and
if the current block is located in the fourth coding-subblock,
the decoder is configured to select the predefined subset of block search regions such that the block search regions comprised by said predefined subset are located
at least partially in the fourth coding-subblock of the current coding-block and
at least partially in the first coding-subblock of the current coding-block and
at least partially in the second coding-subblock of the current coding-block and
at least partially in the third coding-subblock of the current coding-block.

14. The decoder of claim 10,
wherein the decoder is configured to retrieve from a block search region list respective indices of those block search regions which are comprised by the predefined subset of block search regions.

15. The decoder of claim 14,
wherein the decoder is configured to identify a particular one predefined block search region from the block search region list, in which particular one predefined block search region the second predetermined block is located; and
wherein the decoder is configured to assign one predefined block inside that particular one predefined block search region as the first predetermined block, and
to derive from the data stream a differential value indicating the difference between the first predetermined block and the second predetermined block inside that particular one predefined block search region.

16. The decoder of claim 4,
wherein the decoder is configured to decode the current block from the second predetermined block, based on the region-index derived from the data stream and based on the differential value derived from the data stream.

17. A method for block-based decoding a picture from a data stream using a decoder, the method comprising:

reconstructing a current block of the picture based on a difference between a first predetermined block and a second predetermined block inside a block search area, wherein said difference is derived from the data stream, wherein the block search area is partitioned into multiple block search regions, applying a block-vector-based signaling using a first block vector and a second block vector, the first block vector indicating a relative spatial distance between the current block and the first predetermined block, and the second block vector indicating a relative spatial distance between the current block and the second predetermined block; and wherein the first block vector is known to the decoder and wherein the method comprises further steps of deriving from the data stream a differential vector representing the difference between the first block vector and the second block vector, and calculating the second block vector based on said differential vector and the first block vector to acquire, in result, the relative spatial distance between the current block and the second predetermined block in order to predictively decode the current block.

18. A non-transitory digital storage medium having a computer program stored thereon to perform a method for block-based decoding a picture from a data stream using a decoder, the method comprising reconstructing a current block of the picture based on a difference between a first predetermined block and a second predetermined block inside a block search area, wherein said difference is derived from the data stream, wherein the block search area is partitioned into multiple block search regions, applying a block-vector-based signaling using a first block vector and a second block vector, the first block vector indicating a relative spatial distance between the current block and the first predetermined block, and the second block vector indicating a relative spatial distance between the current block and the second predetermined block; and wherein the first block vector is known to the decoder and wherein the method comprises further steps of deriving from the data stream a differential vector representing the difference between the first block vector and the second block vector, and calculating the second block vector based on said differential vector and the first block vector to acquire, in result, the relative spatial distance between the current block and the second predetermined block in order to predictively decode the current block, when said computer program is run by a computer.

19. A decoder for block-based decoding a picture from a data stream, wherein the decoder is configured to reconstruct a current block of the picture based on a difference between a first predetermined block and a second predetermined block inside a block search area, wherein the decoder is configured to derive said difference from the data stream, wherein the decoder is further configured to partition the block search area into multiple block search regions, wherein the decoder is configured to derive from the data stream a region-index being associated with one predefined block search region out of the multiple block search regions, the region-index for indicating in which one predefined block search region the second predetermined block is located;

wherein the decoder is aware of a predefined position inside said one predefined block search region, said predefined position indicating the first predetermined block inside said one predefined block search region; and wherein the decoder is configured to derive an indication from the data stream, the indication indicating a spatial distance between the predefined position and the second predetermined block inside said one predefined block search region, said spatial distance representing the difference between the first predetermined block and the second predetermined block inside said one predefined block search region.

* * * * *